United States Patent [19]

Gotou et al.

[11] Patent Number: 4,713,697
[45] Date of Patent: Dec. 15, 1987

[54] CAMERA APPARATUS

[75] Inventors: Makoto Gotou, Nishinomiya; Hiroshi Mitani, Daito; Yoshiaki Igarashi, Ikoma, all of Japan

[73] Assignee: Matsushita Electric Industrial Co., Ltd., Osaka, Japan

[21] Appl. No.: 851,528

[22] Filed: Apr. 14, 1986

[30] Foreign Application Priority Data

| Apr. 18, 1985 | [JP] | Japan | 60-82864 |
| Apr. 18, 1985 | [JP] | Japan | 60-82865 |
| May 7, 1985 | [JP] | Japan | 60-96924 |
| May 8, 1985 | [JP] | Japan | 60-97201 |
| May 20, 1985 | [JP] | Japan | 60-10733 |

[51] Int. Cl.$^4$ .................................... H01J 31/50
[52] U.S. Cl. ..................................... 358/222; 358/229
[58] Field of Search ............... 358/222, 229; 352/242, 352/243; 350/500

[56] References Cited

U.S. PATENT DOCUMENTS

| 3,577,205 | 5/1971 | Hobrough | 358/222 |
| 4,623,930 | 11/1986 | Oshima | 358/222 |
| 4,625,938 | 12/1986 | Brown | 358/229 |

FOREIGN PATENT DOCUMENTS

| 50-13030 | 5/1975 | Japan | 358/222 |
| 56-85464 | 12/1979 | Japan | 358/222 |

OTHER PUBLICATIONS

"Vibration Isolator Servo System for TV Cameras", by Takuji Sekiguchi et al., NHK Technical Report, vol. 27, No. 11, Nov. 1984.

Primary Examiner—Gene Z. Rubinson
Assistant Examiner—L. C. Schroeder
Attorney, Agent, or Firm—Wenderoth, Lind & Ponack

[57] ABSTRACT

The present invention provides a novel camera apparatus which can be discretely split into two parts; a lens barrel unit and a lens-barrel-support unit which allows the lens barrel unit to freely turn its direction. A built-in angular rate detector detects a swinging movement of the lens barrel unit, whereas a position detector detects a position relationship between the lens barrel unit and the support unit. An operator unit storing programs controls a drive operation of an actuator that generates a specific amount of torque between the lens barrel unit and the support unit to reduce an output from a system controller unit so that swinging symptom of video picture caused by the swinging movement of the video camera can be eliminated. In addition to this primary function, the operator unit also executes its secondary function, in which the operator unit first detects intention of a camera operator by identifying a varied position relationship between the lens barrel unit and the support unit when one intentionally changes an aimed direction of the video camera and then the operator unit controls the driving of the actuator so that the lens barrel unit can correctly face the aimed direction.

22 Claims, 37 Drawing Figures

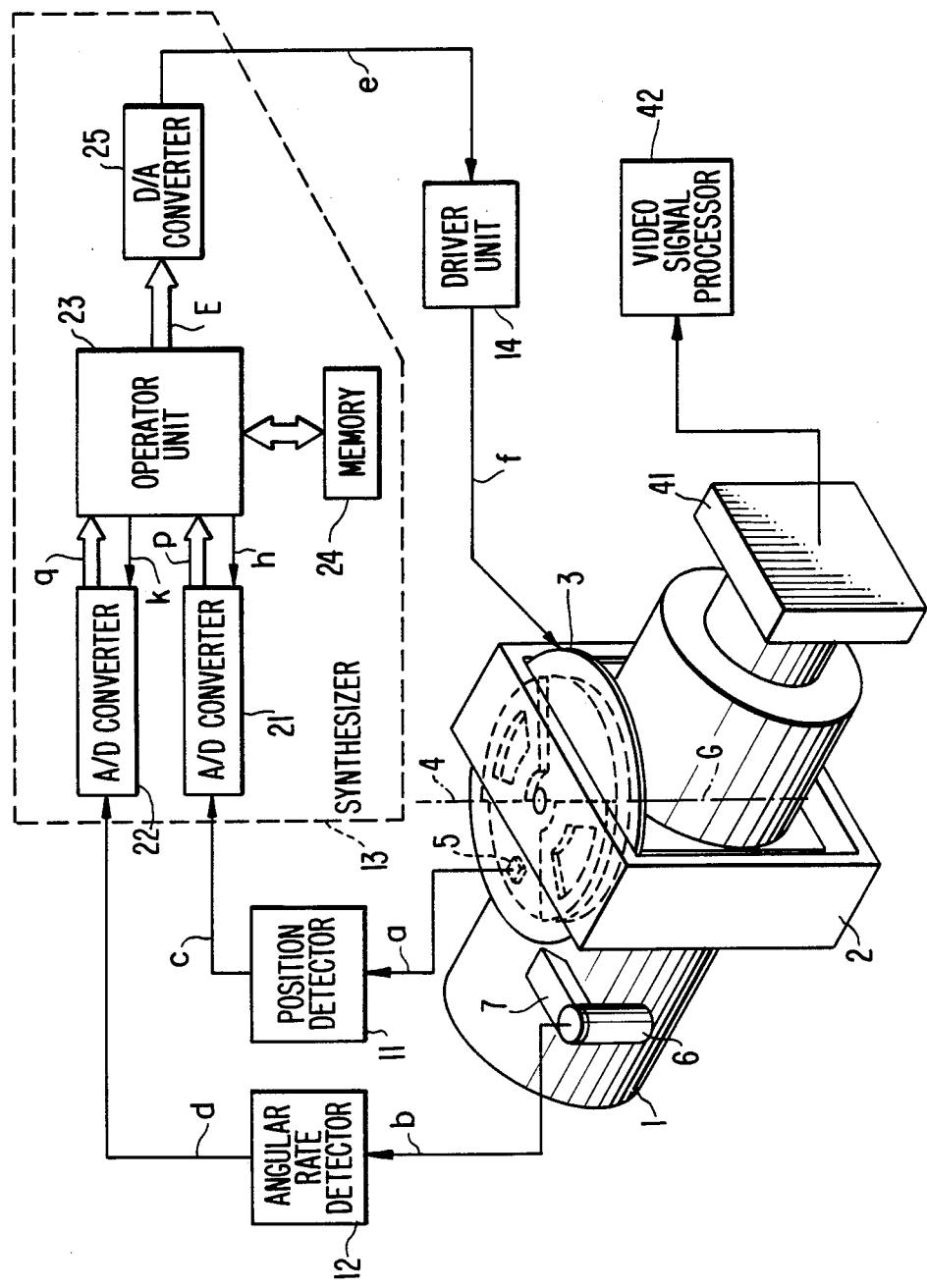

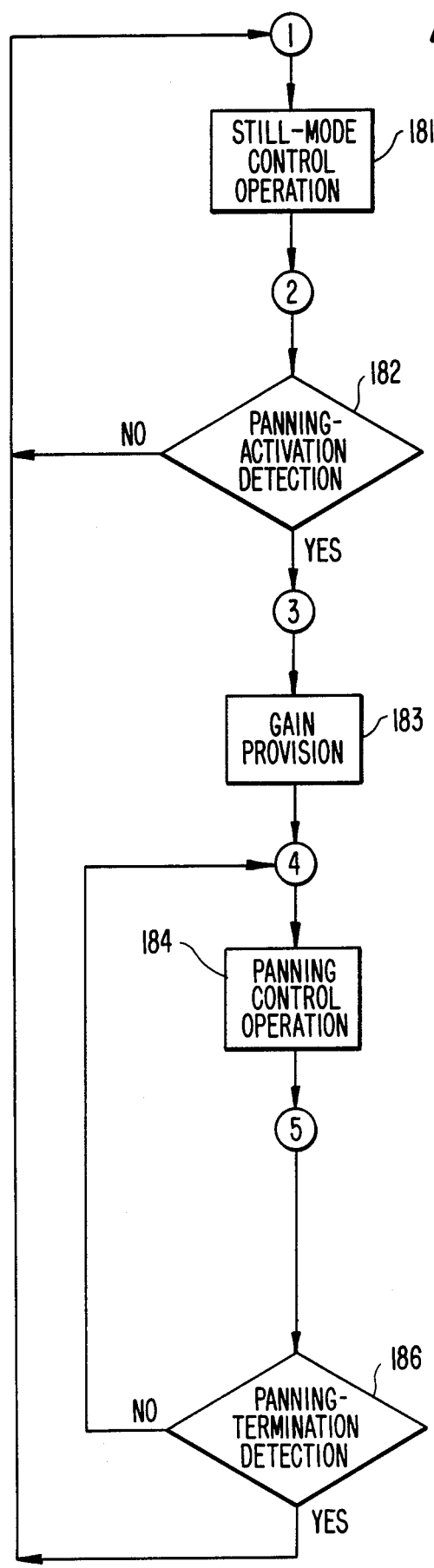

CAMERA APPARATUS

BACKGROUND OF THE INVENTION

1. Field of the Invention

The present invention relates to a camera apparatus which executes image-pickup operation of moving picture, more particularly, to a camera apparatus which is provided with function securely preventing video picture from incurring swinging symptom even when swinging unavoidably takes place with the video camera so that stable video picture can always be realized throughout the image-pickup operation.

2. Description of Prior Arts

Recently, reflecting significant improvement of modern electronics mainly promoted by semiconductor-processing technology, remarkable progress has been achieved by consumer-use portable video camera made available in combination with video tape recorder including its compactness and light-weight construction. In addition, full automation including autofocussing function is rapidly promoted by advanced microprocessor technology, thus eventually resulting in the sharply grown demand for video camera today.

On the other hand, despite the light-weight construction of video camera, lens scale-factor still remains unchanged. Consequently, when the camera operator manually takes picture with a portable video camera, the lighter the total weight of the video camera, the greater is the vibration of the portable video camera, thus making it quite difficult for him to gain access to stable video picture by manually operating the hand-held video camera. Conversely, professional video cameras made available for broadcast stations feature complex picture-swing prevention device that stabilizes swinging video picture into normal state, which is typically comprised of means for detecting acceleration of the video camera, means for detecting the amount of displacement relative to the supporter unit mounting the video camera and the integrated unit of the video camera and the supporter unit, means for detecting difference between signal from displacement-detection means and the reference comparison signal by comparing these to each other, means for detecting relative speed between the video camera and the supporter unit, and driver means for driving the video camera by applying specific driving force which is proportional to the sum of signals from those means for detecting acceleration, comparative signal difference, and relative-speed, respectively. The picture-swing prevention device which is typically provided with those means mentioned above causes substantial inertia mass to increase in the video camera by generating specific driving force to reduce acceleration from the video camera so that the video picture can eventually be stabilized. Nevertheless, since the conventional technique used for stabilizing video picture mentioned above is mainly designed for use with automobiles, aircraft, and ships, when the camera operator desires to perform panning in the desired direction by varying the aimed direction of the video camera, the system controller also needs to vary the reference comparison signal simultaneously. Since it is practically impossible for technicians of any broadcast station to manually support both the picture-swing prevention device and a large-size professional video camera at the same time, they have nothing to do with the problem mentioned above. Conversely, when applying such a conventional video picture stabilizing technique to any consumer-use video camera featuring compact-size and light-weight for manually taking video picture, in order to properly perform panning operation the reference comparison signal should be varied. In other words, when manually operating a consumer-use video camera, the camera operator needs to support both the video camera and the picture-swing prevention device, and yet, he needs to keep controlling the reference comparison signal for varying the aimed camera direction. Compared this to any of conventional professional video cameras dispensing with compensation for the swinging video picture, it is obvious that the compact and light-weight portable video camera involves significantly complex operations.

References related to the above described prior art are Japanese Published Patent Application (Kokoku) No. 50-13030, Japanese Laid-Open Utility Model Application (Kokai) No. 56-85464, and "Vibration Isolator Servo System for TV Cameras" by Takuji Sekiguchi et al, NHK TECHNICAL REPORT, Vol. 27, No. 11 (November 1984).

SUMMARY OF THE INVENTION

An object of the present invention is to provide a compact video camera apparatus capable of securely stabilizing swinging video picture caused by swinging movement of the apparatus without adversely affecting operational convenience. To realize this, the camera apparatus of the present invention: a lens barrel unit incorporating a lens and an image pickup element; picture signal processing means for generating a picture signal from an electrical signal produced by the picture element; a support means supporting said lens barrel unit rotatably about a rotation axis thereof that crosses an incident beam axis entering the lens barrel unit in either right angle or in almost right angle so that the lens barrel unit can freely turn in an aimed direction; actuator means which is installed between the lens barrel unit and support means for driving the lens barrel unit; angular rate detection means for detecting an angular rate of the lens barrel unit about the rotation axis; position-detection means for detecting a relative angle between the lens barrel unit and support means; synthesizing means that outputs a control signal in response to output signals of the position-detection means and angular rate detection means; driver means feeding power to the actuator means in response to the control signal from the synthesizing means; panning-detection means for detecting that panning operation is underway; and means for changing operations of the synthesizing means according to the detection result of the panning-detection means.

The camera apparatus according to the present invention first detects a position relationship between the lens barrel unit and the support means as well as an angular rate of the lens barrel unit, followed by control of the movement of the lens barrel unit by the actuator means so as to suppress variations of the relative position of the lens barrel unit to the support means and the angular rate of the lens barrel unit, thus effectively minimizing swinging symptom present in the lens barrel unit and thus eventually preventing video picture from swinging. Furthermore, the camera apparatus of the present invention causes synthesizing means to change its operation by applying a synthetic-operation changing means as soon as the panning-detection means detects the activation of the panning operation so that the lens barrel unit can eventually be oriented in the direction which is actually aimed at by a camera operator.

BRIEF DESCRIPTION OF THE DRAWINGS

The present invention will be better understood from the detailed description given hereinbelow and the accompanying drawings which are given by way of illustration only, and thus are not limitative of the present invention wherein:

FIG. 1 is a fundamental schematic block diagram of a camera apparatus reflecting a preferred embodiment of the present invention;

FIG. 5 is a simplified block diagram showing an example of constitution of an A/D converter;

FIG. 6 is a circuit diagram showing an example of electric circuit of a driver means;

FIG. 7 is a basic flowchart showing a program used for driving an operator unit;

DESCRIPTION OF THE PREFERRED EMBODIMENTS

Figure 2A:
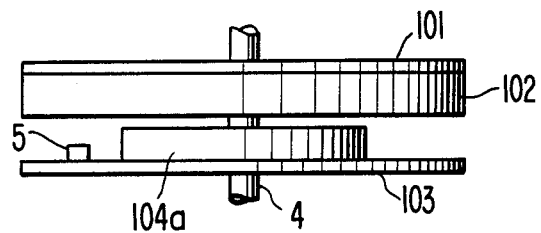
FIGS. 2(a) through (c) are respectively schematic diagrams of an actuator incorporating a magnetic flux sensing element which make up a part of a position-detection means.

FIG. 1 is a simplified block diagram of the camera apparatus reflecting a preferred embodiment of the present invention. A lens barrel unit 1 of the video camera incorporates a lens (not shown) and an image-pickup element 41 such as a charge-coupled device (CCD) plate or an image pickup tube for example in order that a light reflected from an object can be focussed onto image-pickup element 41 to generate an image which is converted into a charge signal, i.e., an electrical signal. By sequentially reading the charge signal delivered from the image-pickup element 41, a video signal processor 42 generates a video signal of the NTSC system. An actuator 3 is installed between lens barrel unit 1 and a housing (supporting) unit 2 for driving lens barrel unit 1 so that lens barrel unit 1 can be rotated in a desired direction about a rotation shaft 4. The lens barrel unit 1 freely rotates on the generally horizontal plane when used in normal condition. Rotation shaft 4 of rotating actuator 3 is supported by housing unit 2 at the center of gravity G of lens barrel unit 1 so that actuator 3 can freely rotate. Although not shown in FIG. 1, housing unit 2 is provided with grip means allowing a camera operator to manually handle the video camera.

Figure 2B:
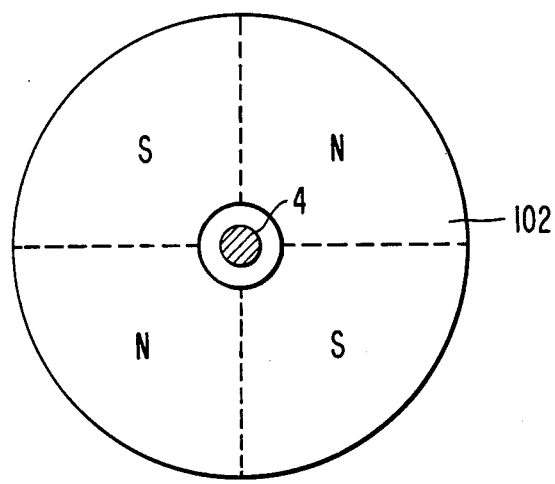
Figure 2C:
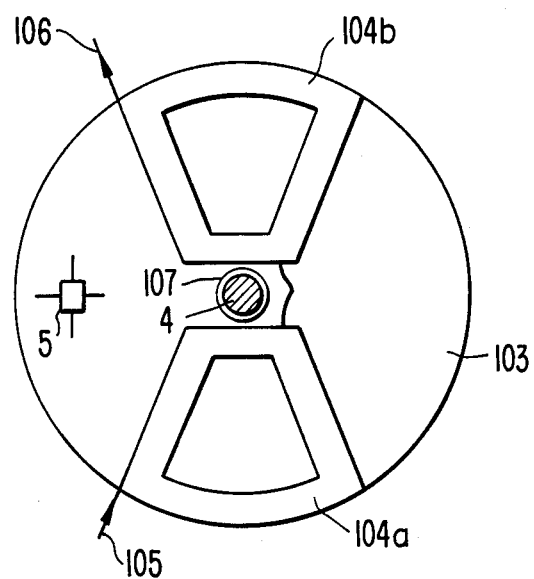

FIGS. 2(a) through (c) respectively show concrete constitution of actuator 3. In FIG. 2, a backyoke 101 made of ferromagnetic substance attached to a magnet 102 is secured to lens barrel unit 1 and rotates together with rotation shaft 4. Four poles of magnet 102 is magnetized, thus generating a field magnetic flux. Coils 104a and 104b and a hall element 5 which is substantially an element sensing magnetic flux are respectively secured to a coil yoke 103 which is provided with a bearing 107 of rotation shaft 4. According to this embodiment, magnet 102 and coil yoke 103 are respectively secured to lens barrel unit 1 and housing unit 2. Note that the relationship of these may be reversed. Coils 104a and 104b are connected in series to each other. Rotation torque is generated by a current flowing from a terminal 105 to a terminal 106 as well as by the magnetic flux of magnet 102. Hall element 5 is secured to coil yoke 103 at a position almost opposite to the switching portion of the magnetic poles of magnet 102 and generates a specific output signal corresponding to the relative angle position ($\theta h = \theta x - \theta m$) between magnet 102 having angle position $\theta m$ of the lens barrel unit 1 and coil yoke 103 having angle position $\theta x$ of the housing unit 2. Note that $\theta m$ denotes the angle of lens barrel unit 1 about rotation shaft 4 viewed from an inertia coordinate in the absolute space, whereas $\theta x$ denotes the angle of housing unit 2 about rotation shaft 4 viewed from the inertia coordinate which is identical to the above.

Figure 3:
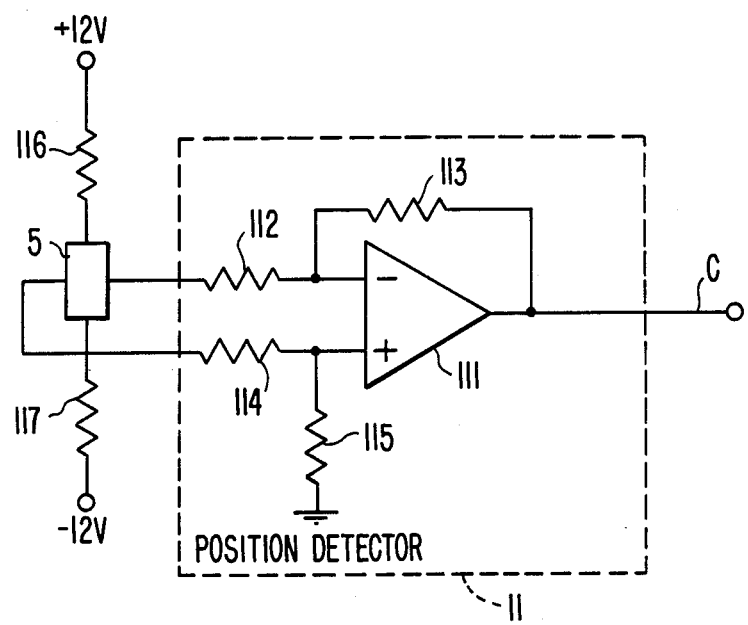
FIG. 3 is a circuit diagram showing an example of electric circuit of the position-detection means.

Hall element 5 first detects the magnetic flux of magnet 102 which is secured to actuator 3 and then delivers a signal "a" to a position-detector 11. FIG. 3 shows a concrete constitution of the position-detector 11. DC signals generated by two output terminals of hall element 5 are amplified to a predetermined level of multiple by a differential amplifier circuit comprised of an operational amplifier 111 and resistors 112 through 115 to produce an output signal "c".

Angular rate sensor 6 made of vibrating gyro is secured to lens barrel unit 1 via a fixation member 7.

Angular rate detection axis of angular rate sensor 6 correctly matches rotation shaft 4 of actuator 3 and outputs a signal "b" in correspondence to the rotation angular rate about rotation shaft 4 of lens barrel unit 1 when being placed in the inertia coordinate. Signal "b" from angular rate sensor 6 is delivered to angular rate detector 12, which then generates a signal "d" which is proportional to an angular rate $\omega m$ about rotation shaft 4 of lens barrel unit 1 viewed from the inertia coordinate or proportional to specific components of the designated frequency range of angular rate $\omega m$.

Figure 4:
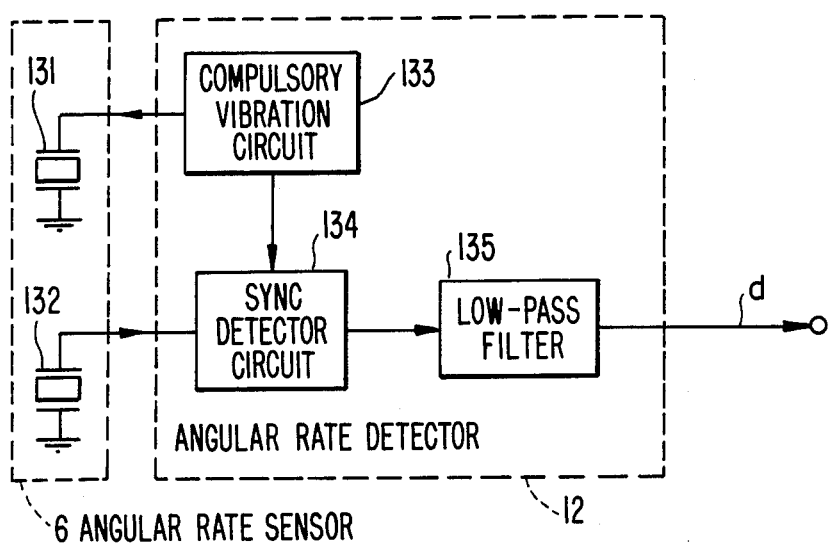
FIG. 4 is the simplified block diagram showing an example of constitution of an angular rate detection means.

FIG. 4 shows a concrete constitution of angular rate detector 12. A compulsory vibration circuit 133 incorporates a sinewave oscillation circuit generating 1 KHz of sinewave frequency and outputs a specific signal containing 1 KHz of oscillated frequency to compulsorily vibrate a piezeoelectric drive element 131 of the angular rate sensor 6. A sensor element 132 made of a piezoelectric element is installed so that it mechanically comes into contact with the piezoelectric drive element 131, and as a result, both vibrate together by applying identical frequency.

Simultaneously, lens barrel unit 1 in the inertia coordinate starts to rotate about rotation shaft 4, thus eventually causing dynamic Corioli's force to be generated. Dynamic Coriloi's force is proportional to the multiplied angular rate of two axis crossing each other at right angle in sensor element 132, and thus, it is also proportional to the multiple of angular rate $\omega m$ and the compulsorily vibrated angular rate. Presence of the dynamic Corioli's force causes sensor element 132 to incur mechanical distortion, whereas piezoelectric function generates electrical signals. Specific signals proportional to angular rate $\omega m$ can be generated by a first synchronously detecting signal from sensor element 132 by applying a sync-detector circuit 134 using the same frequency as that is used for generating the compulsory vibration and finally extracting only the low-frequency components ranging from the DC level to a maximum of 100 Hz of the signal from the sync-detector circuit 134 through a low-pass filter 135.

A synthesizer 13 comprised of A/D converters 21 and 22, an operator unit 23, a memory 24, and a D/A converter 25, executes synthesis of signal "c" from position-detector 11 and signal "d" from angular rate detector 12 to generate a synthesized signal "e". A/D converter 21 generates a digital signal "p" which corresponds to the value of signal "c" from position-detector 11. A/D converter 22 generates a digital signal "q" corresponding to the value of signal "d" from angular rate detector 12. The operator unit 23 (which can be comprised by a microcomputer) executes a variety of operations in accordance with specific programs stored in ROM (read-only memory) of memory 24. The operator unit 23 feeds digital signals "p" and "q" from A/D converters 21 and 22 to RAM (random access memory), and after executing needed processes, it synthesizes both signals to generate a synthetic signal "E", which is delivered to D/A converter 25 where synthetic signal "e" is eventually generated.

Figures 5, 6:
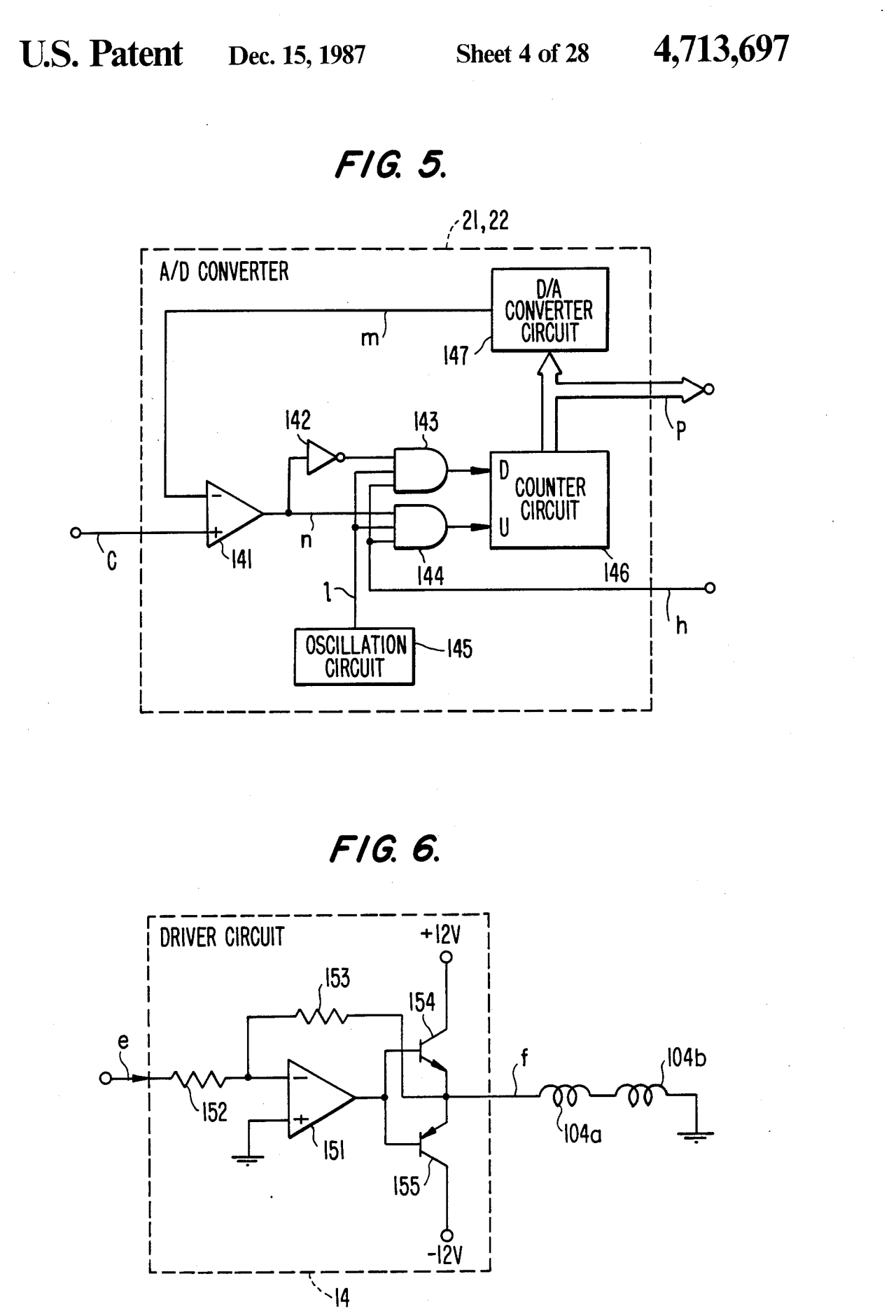

FIG. 5 shows a concrete constitution of A/D converter 21 which is identical to A/D converter 22 in structure. Incoming signal "c" and a signal "m" from a D/A converter circuit 147 are first compared to each other by a comparator 141, which then generates a comparison signal "n" that reflects the magnitude relationship between signals "c" and "m". An oscillation circuit 145 oscillates a clock pulse "1" with a specific frequency. Normally, signal from operator unit 23 remains "H" (high potential) and goes "L" (low potential) when reading digital signal "p". In response to the comparison signal "n" from comparator 141, an inverter circuit 142 and AND circuits 143 and 144 respectively deliver clock pulse "1" to either a down-pulse input terminal D or an up-pulse input terminal U of a counter circuit 146 when signal from operator unit 23 is "H". When clock pulse "1" is delivered to down-pulse input terminal D, counter circuit 146 subtracts its content one by one, and, when clock pulse is delivered to the up-pulse input terminal U, adds up its content one by one. The content of counter circuit 146 is outputted in the form of digital signal "p" to a D/A converter 147, which then converts the input signal into analogue signal "m" which exactly corresponds to digital signal "p". As a result, digital signal "p" in counter circuit 146 is provided with a specific value matching input signal "c". The operator unit 23 reads stable digital signals "p" and "q" by causing counter circuit 146 to stop its operation while signals "h" and "k" respectively remain "L" for a specific short period of time. Signal "e" from D/A converter 25 of synthesizer 13 is delivered to driver unit 14, and then a voltage signal (or a current signal) "f" proportional to signal "e" is fed to coils 104a and 104b of actuator 3.

FIG. 6 shows a concrete constitution of driver unit 14. Power amplifier circuit comprised of an operation-signal amplifier 151, transistors 154 and 155, and resistors 152 and 153, outputs voltage signal "f" after amplifying signal "e" by specific multiple.

Next, programs stored in operator unit 23 made available for the first preferred embodiment will be described below. FIG. 7 denotes a basic flowchart of the program operation, whereas FIGS. 8(a) through (e) respectively shows detailed flowcharts. The basic flowchart shown in FIG. 7 is described below. Note that numerals ① through ⑤ respectively denote nodes which are in accord with numerals shown in FIG. 8.

① Control operation during STILL mode—181

This corresponds to the operation of the synthesizing means. The still-mode control operation corresponds itself to the process for generating synthetic signals when taking an image of a still object.

② Detection of activation of panning—182

This corresponds to the panning-activation detection means of the panning-operation detection means. This detects the activated panning operation, while the program operation proceeds to step ③ while the panning operation is underway. When no panning is performed, program operation returns to step ①.

③ Provision of gain—183

This corresponds to the gain-provision means of the synthesizer operation changing means. This causes the control gain to be established in accordance with the situation present when detecting the activation of the panning operation.

④ Control operation while panning is underway—184

This corresponds to the synthesizing means. Program related to this control operation corresponds to the process for generating synthetic signals while the panning operation is underway.

⑤ Detection of completion of panning operation—186

This corresponds to the panning-termination detection means of the panning-operation detection means. This step detects the completion of the panning operation. When the panning operation is still underway, program returns to step ④. When the completion of the panning operation is detected, program returns to step 1. In this preferred embodiment, the panning-operation detection means is comprised of means for detecting the activation of panning operation (182), and panning-operation completion detection means (186), respectively.

Figure 8A:
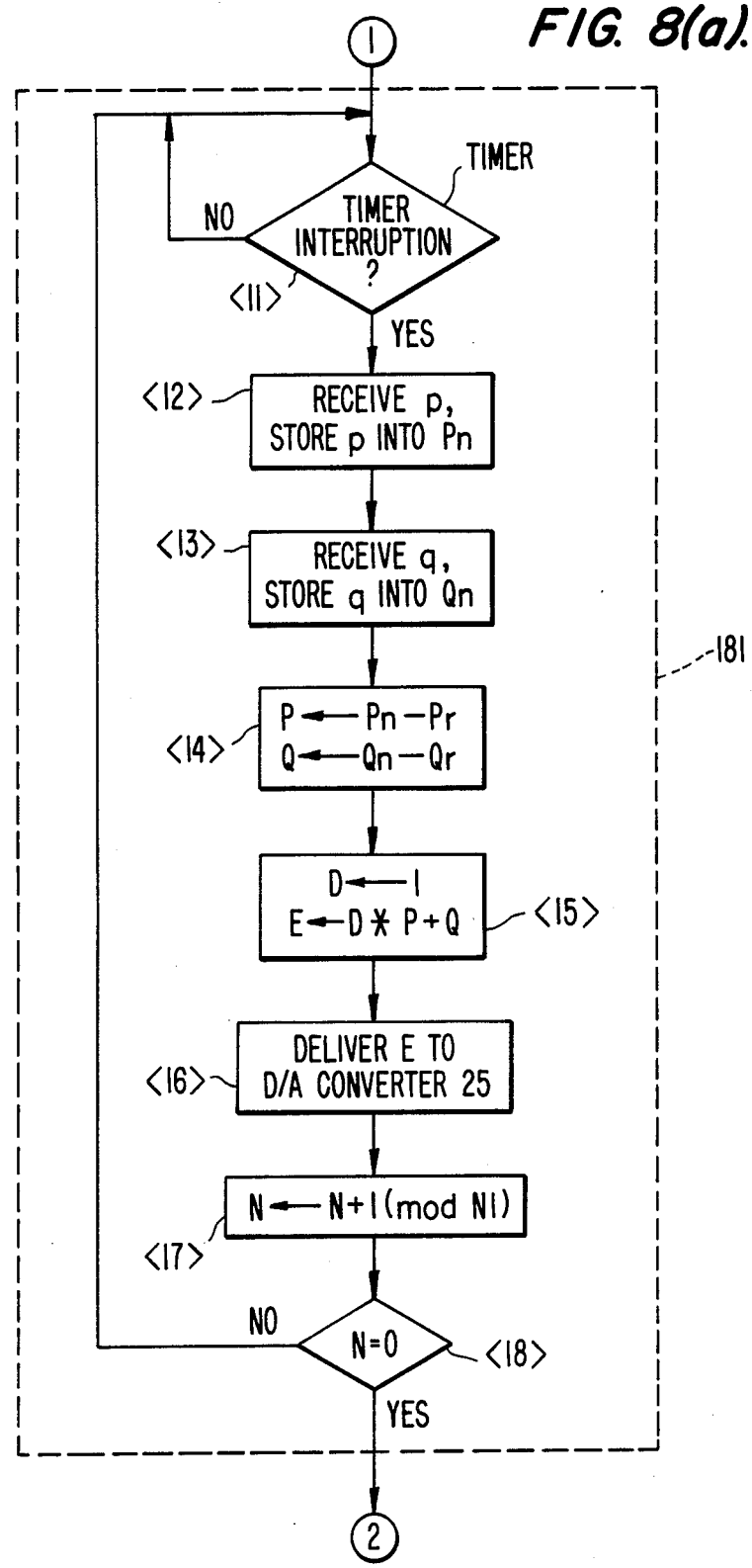
FIGS. 8(a) through (e) are respectively flowcharts describing programs related to the operator unit for executing controls of the still mode, detection of the activated panning operation, provision of gain, and control while panning operation is underway.

Next, operation flowcharts of respective constituents are described below. FIG. 8(a) shows a flowchart related to "control operation during still mode" (181) of step 1.

Step <11> indicates the state awaiting an interruption signal from a timer. Timer generates interruption signals at specific intervals T1 (T1=every 5 msec.). When the interruption signal is generated, the operation mode proceeds to step <12>.

Step <12> causes signal "h" to go "LOW" for a specific short period of time to allow the operator unit to receive digital signal "p", which is then stored in a variable Pn.

Step <13> causes signal "k" to go "LOW" for a specific short period of time to allow the operator unit to receive digital signal "q", which is then stored in a variable Qn.

Step <14> causes a reference value "Pr" to be subtracted from variable Pn ($P=Pn-Pr$), thus computing a digital value P which corresponds to a relative angle $\theta h$ between lens barrel unit 1 and supporter unit 2. Likewise a reference value Qr is subtracted from variable Qn ($Q=Qn-Qr$), thus computing a digital value Q corresponding to angular rate $\omega m$ of lens barrel unit 1 viewed from the inertia coordinate. Those equations shown above indicate that the result of calculation in the right-side is substituted into the variable of the left-side for storage.

Step <15> converts a gain D into "1". In this step, value P is multiplied by D, and then the result is added to Q for synthesis to eventually produce synthesized digital value E (where $E=D\cdot P+Q$). In the flowchart, asterisk (*) denotes multiplication.

Step <16> causes the synthesized digital value E to be delivered to D/A converter 25, which then converts this into analogue signal "e".

Step <17> adds value "1" to a counting variable N by employing a modulus N1, where ($N=N+1$ (modulus N1)). In this example, the sum of N and 1 is stored in N additionally. If the value of N is equal to N1, N is designated to be "O". In this example, N1=10.

Step <18> causes the program to be back to step 11 if N is not "0". If N corresponds to "0", operation mode proceeds to step <21> in conjunction with "detection of the activation of panning operation (182)". In other words, the "detection of the activated panning-operation (182)" is executed at specific intervals denoted by $N1\cdot T1=50$ msec.

Figure 8B:
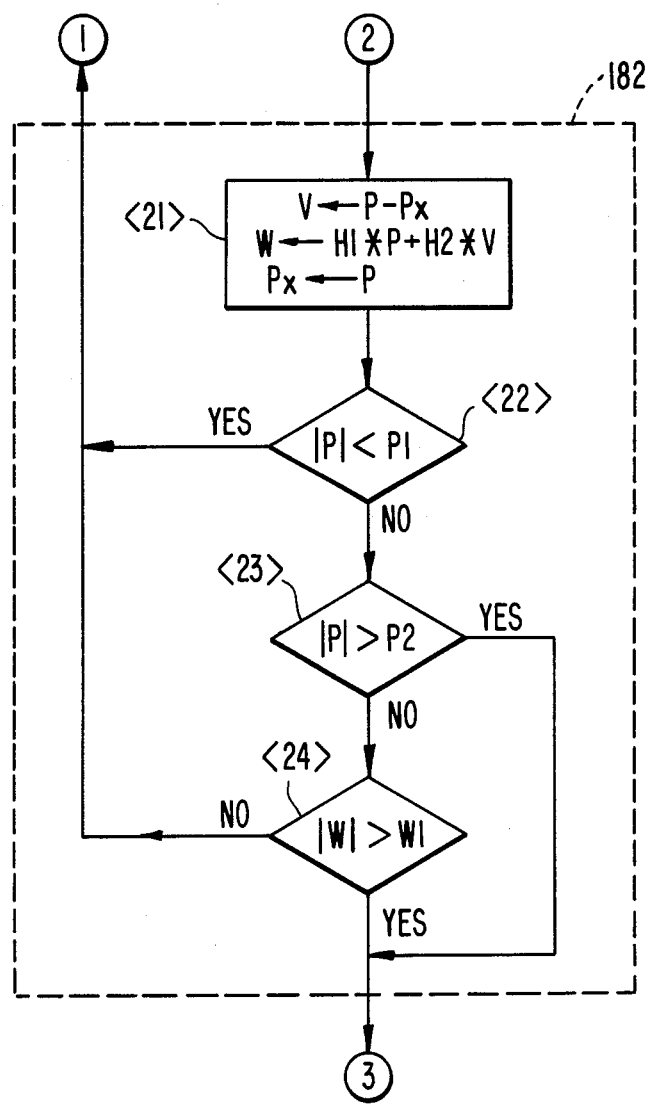

FIG. 8(b) shows a flowchart related to the "detection of the activation of panning operation (182)".

Step <21> allows subtraction of Px from P for storing the result in variable V ($V=P-Px$). Next, the result of the multiplication of P by H1 (where H1 is constant) is added to the result of multiplication of variable V by H2 (where H2 is constant) and storing the sum into variable W, where $W=H1\cdot P+H2\cdot V$. Next, P is converted into new Px (P=Px). In other words, Px is identical to the value of P before N1 is multiplied by T1, while variable V corresponds to a relative angular rate (V) (differentiated value of relative angle $\theta h$) between lens barrel unit 1 and housing unit 2. Consequently, variable W is the value synthesized by relative angle $\theta h$ (P) and relative angular rate (V).

Step <22>—If P is less than P1 (constant), operation mode will be back to step <11> of the "control operation during still mode (181)" and if P is not less than P1, operation mode will proceed to step <23>.

Step <23>—If P is greater than P2 which is the constant greater than P1, operation mode will proceed to step <31> of the "provision of gain (183)". If P is not greater than P2, operation mode will proceed to step <24>.

Step <24>—If W is greater than W1 (constant), operation mode will proceed to step <31> of the "provision of gain (183)". If W is not greater than W1, operation mode will be back to step <11> of the "control operation during still mode (181)". When operation mode remains in steps <21> through <24> of the "detection of the activation of panning operation (182)", the activated panning operation is detected by identifying digital value P corresponding to relative angle $\theta h$ and the other digital value V corresponding to the relative angular rate.

Figure 9:
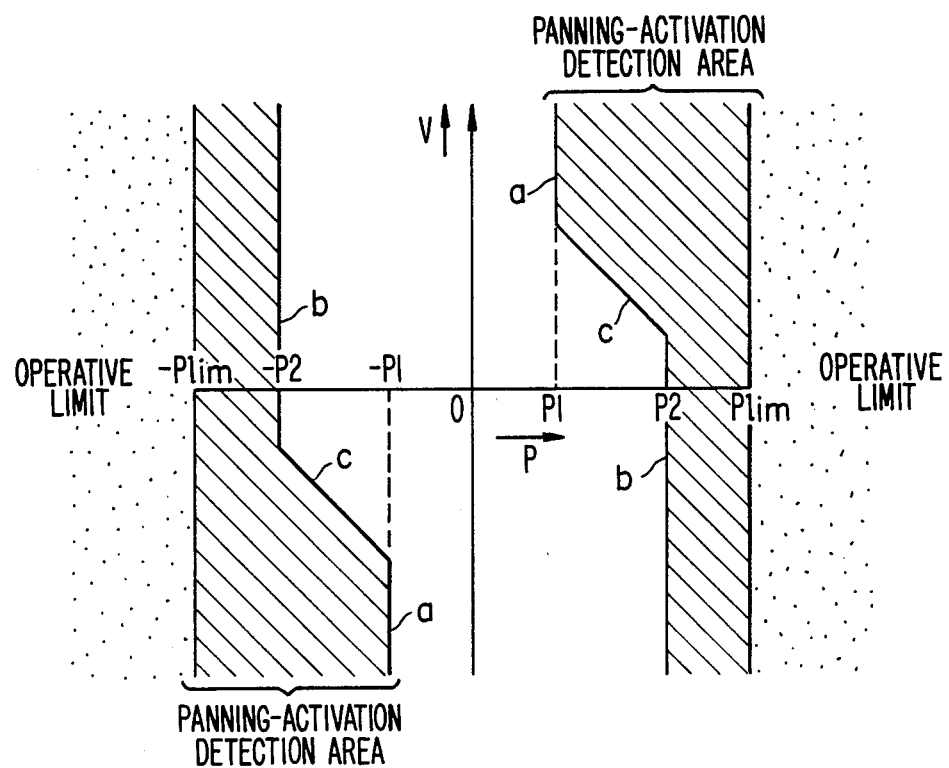
FIG. 9 is a chart showing a panning-start-detectable area when the relative angle of the lens barrel unit and the supporting unit is taken on the horizontal axis and the relative angular rate on the vertical axis.

FIG. 9 shows an area (shadow-line portion) in which activated panning operation is detected by identifying the presence of digital values P and V. Line a corresponds to the state denoted by P=P1, line b corresponds to the state denoted by P=P2, and line c corresponds to the state denoted by $|W|=W1$, respectively. It is identified that the panning operation is activated as soon as digital values P and V respectively enter into shadow-line portions. In other words, the activation of the panning operation is detected by identifying that the relative angle $\theta h$ of lens barrel unit 1 and housing unit 2 is out of the predetermined range (where $|P|$ is greater than P2), or the synthetic value (W) of relative angle $\theta h$ and relative angular rate is out of the predetermined range (where W is greater than W1) when relative angle $\theta h$ of lens barrel unit 1 and housing unit 2 is out of the predetermined range (where $|P|$ is greater than P1). Note that vertical broken lines of FIG. 9 respectively denote the edges of operative limit, and thus, P=Plim represents collision of lens barrel unit 1 and housing unit 2.

Figure 8C:
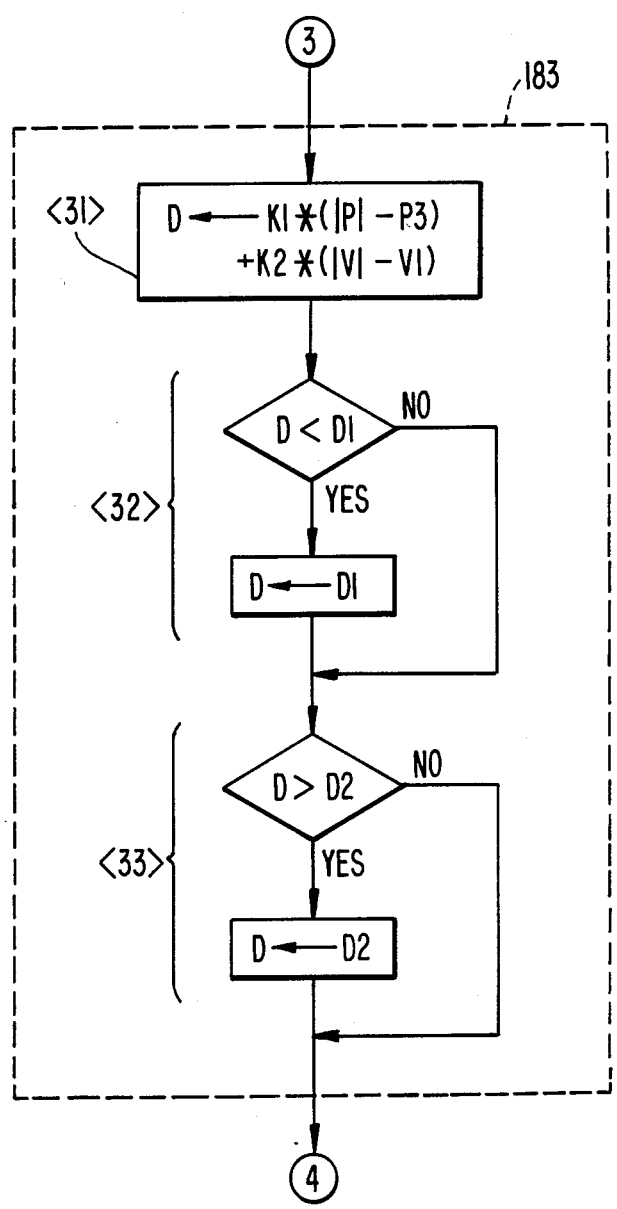

FIG. 8(c) is a flowchart in conjunction with the "provision of gain (183)".

Step <31> first causes the result of subtraction of P3 (where P3 is constant denoted by $P3\leq P2$) from P to be multiplied by K1 (where K1 is constant including "0") and then causes the result of subtraction of V1 (where V1 is constant) from V to be multiplied by K2 (where K2 is constant including "0"), and finally adds these values to make up gain D. This is represented by ($D=K1\cdot(P-P3)+K2\cdot(V-V1)$). Concretely, a specific value corresponding to either relative angle $\theta h$ and/or relative angular rate at the moment of detecting the activated panning operation is set by an initial-value provision means as the initial value of gain D.

Step <32>—If D is less than D1, D is converted into D1 by a lower-limit value restrictive means, where D1 is constant which is approximately 1 like D1=1 for example.

Step <33>—If D is greater than D2, D is converted into D2 by an upper-limit restrictive means, where D2 is constant which is substantially greater than 1 like D2=25 for example.

Figure 8D:
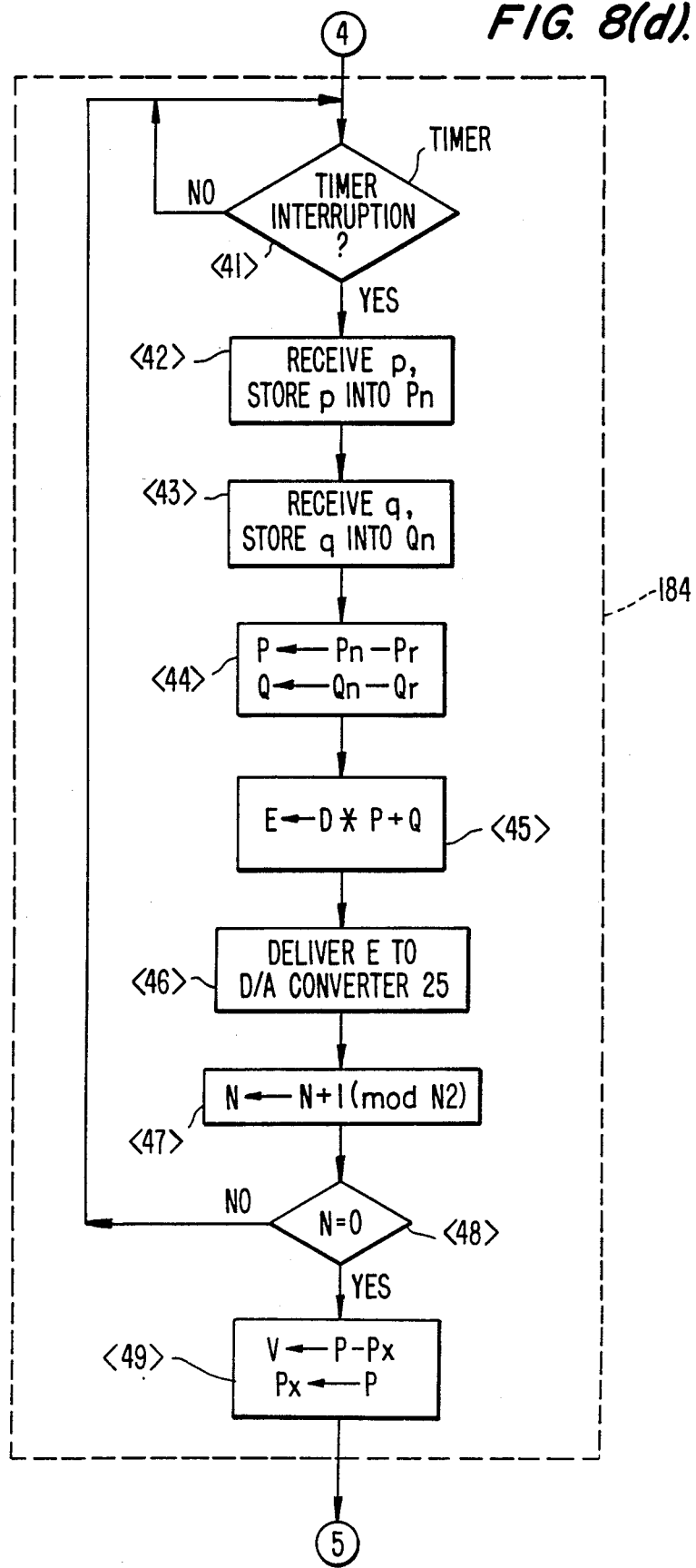

FIG. 8(d) is a flowchart showing the "control operation during panning (184)".

Step <41> indicates the state awaiting an interruption signal from a timer. Timer generates interruption signals at specific intervals T1 (T1=5 msec). When the interruption signal is generated, the operation mode proceeds to step <42>.

Step <42> causes signal "h" to go "LOW" for a specific short period of time to allow the operator unit to receive digital signal "p", which is then stored in variable Pn.

Step <43> causes signal "k" to go "LOW" for a specific short period of time to allow the operator unit to receive digital signal "q", which is then stored in variable Qn.

Step <44> causes the reference value "Pr" to be subtracted from variable Pn ($P=Pn-Pr$), thus computing digital value P which corresponds to the relative angle $\theta h$ between lens barrel unit 1 and supporter unit 2. Likewise, the reference value "Qr" is subtracted from variavble Qn ($Q=Qn-Qr$), thus eventually computing digital value Q corresponding to angular rate $\omega m$ of lens barrel unit 1 viewed from the inertia coordinate.

Step <45> first multiplies gain D by P and then adds the result to digital value Q and eventually producing synthetic digital value E ($E=D\cdot P+Q$).

Step <46> causes synthetic digital value E to be delivered to D/A converter 25, where this signal is converted into analogue signal "e".

Step <47> adds value "1" to the counting variable N by employing modulus N2 ($N=N+1$ (modulus N2)). During this step, the sum of N and 1 is stored in N additionally. If the value of N is equal to N2, N is designated to be "0". In this example, N2=10.

Step <48> causes the operation mode to be back to step <41> if N is not "0". If N corresponds to "0", the operation mode proceeds to step <49>.

Step <49> first executes subtraction of Px from digital value P and storing the result into V ($V=P-Px$). Then, digital value P is converted into renewed Px (P=Px).

Note that, basically, the "control operation during panning mode (184)" and "control operation during still mode (181) respectively execute identical control operations, however, value of gain D greatly differs from each other.

Figure 8E:
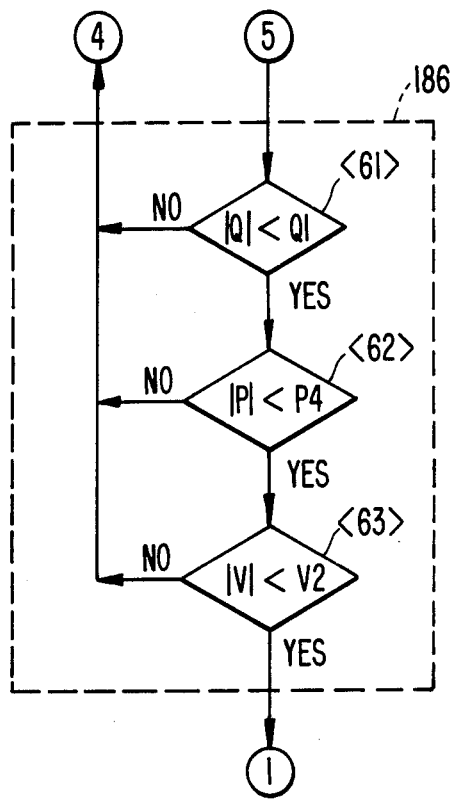

FIG. 8(e) is an operation flowchart in conjunction with the "detection of the termination of panning operation (186)".

Step <61>—If constant Q1 is greater than digital value $|Q|$, operation mode proceeds to step <62>. If constant Q1 is not greater than digital value $|Q|$, the operation mode will be back to step <41> related to the "control operation during panning mode (184)".

Step <62>—If constant P4 is greater than digital value $|P|$, operation mode proceeds to step <63>. If constant P4 is not greater than digital value $|P|$, the operation mode will be back to step <41> related to the "control operation during panning mode (184)".

Step <63>—If constant V2 is greater than relative angular rate $|V|$, operation mode will be back to step <11> related to the "control operation during still mode (181)". If constant V2 is not greater than relative angular rate $|V|$, the operation mode will be back to step <41> related to the "control operation during panning mode (184)".

Termination of the panning operation is detected by executing the "detection of the terminated panning operation (186)" after it is identified that an angular rate $\omega m$ of lens barrel unit 1 viewed from the inertia coordinate is within a specific range (where constant Q1 is greater than digital value $|Q|$), the relative angle $\theta h$ between lens barrel unit 1 and housing unit 2 is within a specific range (where constant P4 is greater than digital value $|P|$), and the relative angular rate (which is the differentiated value of relative angle $\theta h$) is within a specific range (where constant V2 is greater than relative angular rate $|V|$).

Figure 10:
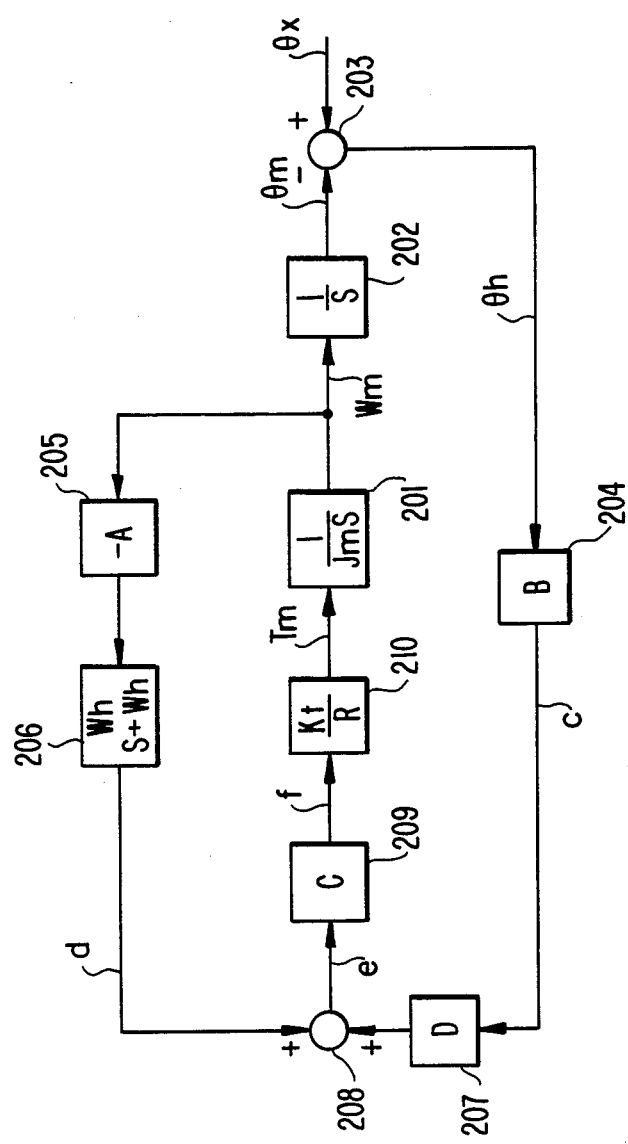
FIG. 10 is a simplified block diagram of an example of a control system.

Next, characteristics in conjunction with a swing-prevention means provided for the camera apparatus related to the present invention are described below. Referring to the simplified block diagram of the control system shown in FIG. 10, the relative angle $\theta h=\theta x-\theta m$ between angle $\theta m$ of lens barrel unit 1 and angle $\theta x$ of housing unit 2 viewed from the inertia coordinate is easily detected by hall element 5 that detects magnetic field of magnet 102 secured to actuator 3. Block 204 represents both hall element 5 and position-detector 11, where position-detector 11 outputs signal "c" which is B-times the relative angle $\theta h$. On the other hand, angular rate $\omega m$ of lens barrel 1 viewed from the inertia coordinate is detected by angle-speed sensor 6 and angular rate detector 12, while the detection means are denoted by blocks 205 and 206 shown in FIG. 10. Block 205 incorporating angular rate sensor 6 and sync-detector circuit 134 first detects a specific signal containing A-times multiplied angular rate $\omega m$, and then block 206 causes the low-pass filter to filter out ripple voltage containing a minimum of 100 Hz (which is denoted by $fH=\omega h/2\pi=100$ Hz) of high-frequency components to eventually extract only signal "d" containing DC through a maximum of 100 Hz of frequency components needed for varying an angular rate $\omega m$. Synthesizer means 13 is denoted by block 207 and adder 208, which first multiplies signal "c" by D and then adds the result to signal "d" to produce synthetic signal "e". Block 209 related to driver 14 amplifies the synthetic signal "e" by C to generate voltage signal "f". Block 210 dealing with actuator 3 converts voltage signal "f" into torque Tm. The reference character R denotes resistance value synthesized by coils 104a and 104b, whereas the reference character Kt denotes torque constant. Block 201 represents transfer of torque Tm generated by mechanical moment of inertia Jm of lens barrel unit 1 to the angular rate $\omega m$, whereas block 202 represents the relationship between the angular rate $\omega m$ and angle $\theta m$ of the lens barrel unit 1 viewed from inertia coordinate. The reference character "s" denotes a complex value of Laplace transform. In conjunction with the transfer function from angular rate $\omega m$ to signal d, if block 206 related to frequency is represented by equations (1) and (2) shown below $$F(s)=\{\omega h/(s+\omega h)\} \quad (1)$$

$$L=C\cdot(Kt/R)\cdot(1/Jm) \quad (2)$$

then, the transfer function from $\theta x$ to $\theta m$ is represented by the equation (3) shown below.

$$G(s)=\theta m/\theta x=(B\cdot D\cdot L)/\{s\cdot s+F(s)\cdot A\cdot L\cdot s+B\cdot D\cdot L\} \quad (3)$$

Accordingly, the following equations (4) through (7) can be established.

$$\omega 1 = 2\pi \cdot f1 = (B \cdot D)/A \quad (4)$$

$$\omega 2 = 2\pi \cdot f2 = A \cdot L \quad (5)$$

$$\omega 1 = 2\pi \cdot f1 << \omega 2 = 2\pi \cdot f2 \quad (6)$$

$$\omega h = 2\pi \cdot fh >> \omega 2 \quad (7)$$

Figure 11:
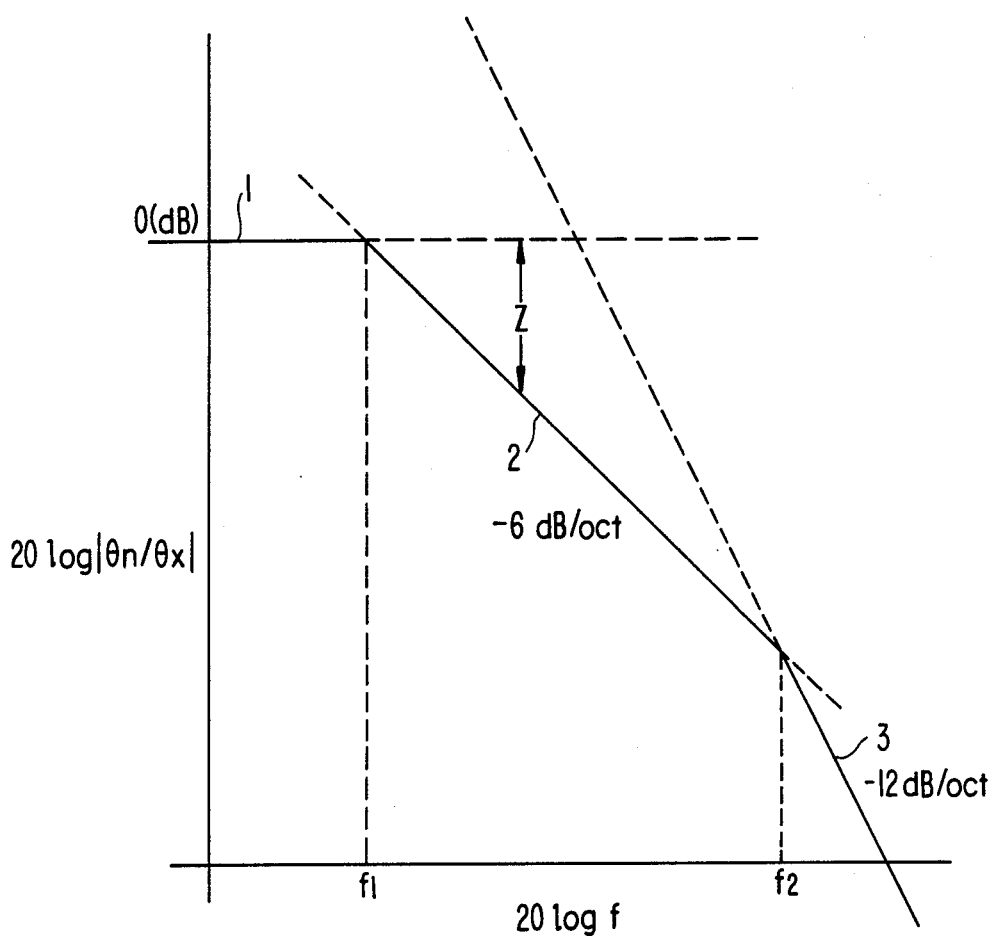
FIG. 11 is a Bode diagram showing an example of frequency characteristic of the transfer function from angle $\theta x$ of the camera housing to angle $\theta m$ of the lens barrel unit in an inertia coordinate.

Actually, f1=0.1 Hz, f2=10 Hz, and fH=100 Hz are made available. By establishing the above relationship, F (jω)=1 is provided in the frequency range f1 to f2, and as a result, approximate Bode characteristic denoted by broken line in conjunction with frequency transfer function G (jω) becomes the one as shown in FIG. 11. In other words, in the frequency range below the first break point frequency f1, transfer characteristic G (jω) of the rotation angle θm of lens barrel unit 1 against the rotation angle θx of housing unit 2 in the inertia coordinate eventually become 1 (0 dB). See line (1). The transfer characteristic G attenuates itself at −6 dB/oct. level within frequencies ranging from a minimum of the first break-point frequency f1 to a maximum of the second break-point frequency f2. See line (2). The transfer characteristic G attenuates itself at −12 dB/oct level in the range above f2 of the break-point frequency. See line (3). These transfer characteristics can be realized by implementing a formula denoted by f2≧6·f1, fh≧3·f2. It is clear from FIG. 11 that the transfer amount of the vibration from angle θx of housing unit 2 to angle θm of lens barrel unit 1 diminishes in a minimum of f1 of the frequency range. The diminishing degree is denoted by difference ZdB between OdB (line 1) and the characteristic line.

Figure 12:
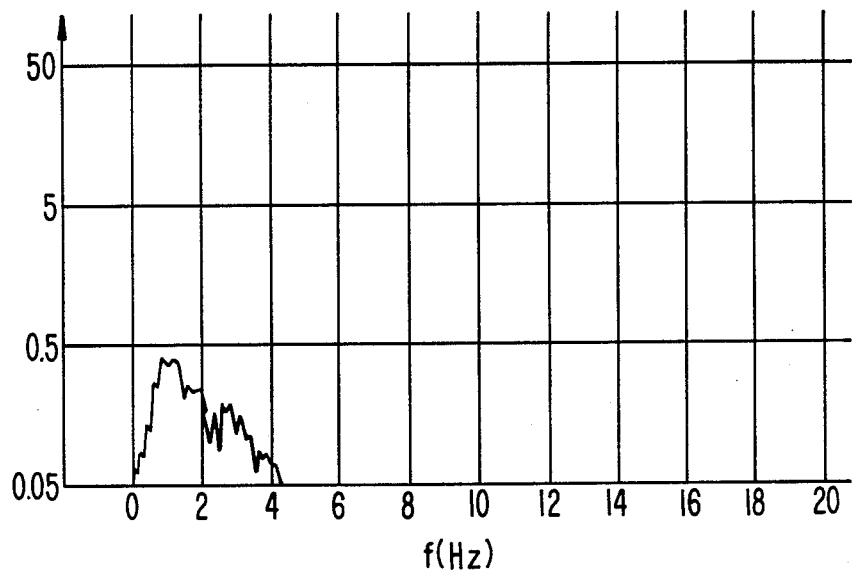
FIG. 12 is a chart of frequency spectrum in conjunction with the swinging movement of the camera housing when video picture is taken by a conventional video camera.

FIG. 12 represents the spectrum analysis reflecting the result of measuring variation of the rotation angle θx of housing unit 2 in the direction of yaw when taking video picture using a conventional video camera without vibration-prevention mechanism. This corresponds to the variation of the rotation angle θx of housing unit 2 when the camera operator takes video picture of a still object while standing still on the ground by manually holding the video camera. The analyzed spectrum proves that the rotation angle θx greatly varies in 0.5 Hz through 5 Hz of the vibration frequency. Consequently, it is understood that application of the vibration-preventive characteristics shown in FIG. 11 to the video camera substantially eliminates vibration from the rotation angle θm of lens barrel unit 1 independent of substantial variation of the rotation angle θx of housing unit 2, thus drastically minimizing swinging symptom of the video picture. This allows the camera operator to take extremely stable video picture throughout the handling operation. In particular, a greater effect can be ensured by introducing an optimum condition denoted by f1≦0.5 Hz. Furthermore, since the camera apparatus embodied by the present invention effectively provides the synthesizer 13 with internal programs that contain means for detecting the activated panning operation and means for correcting gain, even when performing high-speed panning operation with the video camera incorporating preferred embodiments of the invention securely prevents lens barrel unit 1 and housing unit 2 from colliding with each other. Mechanism for preventing both units from collision is described below.

Normally, when taking video picture of moving objects by operating a video camera, the camera operator securely keeps the aimed object within the viewing range of the video camera by rotating himself as the pivot, i.e., by performing panning operation. While panning operation is underway, the video camera rotates itself in the direction of yaw from the viewpoint of inertia coordinate. At the same time, since the video camera executes a specific vibration-preventive operation under characteristics shown in FIG. 11, a considerable delay takes place in the follow-up operation of the rotation angle θm of lens barrel unit 1 against incremental rotation angle θx of housing unit 2.

First, disadvantage inherent to constant gain D (D=1) of synthesizer 13 is described below. As is clear from FIG. 11 and the foregoing equation (4), the less the relative ratio B·D/A of the detected gain B·D of the relative angle θh and the detected gain A of an angular rate ωm up to the addition point 208, the less is the first break-point frequency f1, thus improving the vibration-preventive characteristics. This means that the detected gain B should be set at a minimal level. Nevertheless, when the detected gain B of position-detector 11 is decreased, actuator 3 cannot generate sufficient torque Tm, but negligible amount of torque that can merely match B·θh1 (where θh1 is the value of relative angle θh corresponding to the edge of the operative limit). The less the amount of torque Tm generated by actuator 3, the less is the acceleration of lens barrel unit 1, thus causing the increase of the rotation angle θm of lens barrel unit 1 to extremely delay against the increase of the rotation angle θx of housing unit 2 caused by the panning operation performed. As a result, housing unit 2 collides with lens barrel unit 1 at the edge of the operative limit (|θh|=θh1), and thus, the camera operator receives a specific impact force generated by this collision. Internal collision between these units not only causes the video camera to be eventually damaged itself, but it also incurs uncomfortable feeling to the camera operator, thus collision should be prevented from occurrence by all means. The camera apparatus embodied by the present invention detects the activated panning operation by applying panning-operation detection means for varying gain D as required. As a result, the detected gain B·D of the relative angle θh under the panning operation outgrows the detected gain B while the still-mode operation in underway, thus causing actuator 3 to effectively generate a greater amount of torque Tm that allows lens barrel unit 1 to correctly follow up incremental rotation angle θx of housing unit 2 caused by the panning operation. This securely prevents both lens barrel unit 1 and housing unit 2 from colliding with each other. Next, principles of collision preventive means are described below.

Means for detecting activation of panning operation of panning operation detection means detects the activated panning operation by identifying that either the relative angle θh is out of the predetermined range or the value synthesized by the relative angle and the relative angle speed is out of the specific range in reference to the digital value P which reflects the relative angle θh between lens barrel unit 1 and housing unit 2 and the digital value V reflecting the relative angular rate which is the differentiated value of the relative angle θh. When the camera operator takes video picture of a still object without performing panning operation, the relative angle θh keeps varying itself negligibly within a specific narrow range, thus generating minimal relative angular rate. In other words, absolute values of the digital values P, V, and W remain quite negligible during the still mode, thus causing the operator unit 23 to repeat the "control operation during still mode (181)", while gain D remains "1". If the camera operator starts with panning operation while the above condition is present, since angle θm of lens barrel unit 1 remains unchanged despite the increased rotation angle θx of housing unit 2, the absolute value of the relative angle θh increases, thus causing the absolute value of the relative angular rate to also increase itself. As a result, digital values P and V respectively enter into the activated panning-operation detectable area shown in FIG. 9 when "activated panning-operation detect mode (182)" is entered, thus allowing the panning operation to be detected.

When the "gain-provision mode (183)" is entered, gain D corresponding to digital values P and V at the activation of the panning operation is set to allow the system to proceed to the "control operation during the panning mode (184)". Normally, gain D is provided with an initial value which is greater than "1". This causes lens barrel unit 1 to be driven by a sufficient amount of acceleration to allow angle θm of lens barrel unit 1 to increase by correctly following the incremental angle θx of housing unit 2 caused by activation of the panning operation. As a result, lens barrel unit 1 can be securely prevented from colliding with housing unit 2. Since gain D increases while the panning operation is underway, angle θm of lens barrel unit 1 increases itself following the increase of angle θx of housing unit 2 caused by the activated panning operation. This means that an angular rate θm of lens barrel unit 1 viewed from the inertia coordinate correctly or almost correctly matches the angle speed of housing unit 2, while angular rate θm is out of the predetermined range, where the absolute value of digital value Q is greater than Q1. After terminating the panning operation, the camera operator starts with normal operation for taking video picture of the still object. Since angle θx of housing unit 2 rarely varies itself after terminating the panning operation of the video camera, angle θm of lens barrel unit 1 is apt to remain in the value identical to angle θx. Consequently, angular rate ωm of lens barrel unit 1 is reduced to a negligible value within a specific range or to zero, and in addition, both the relative angle θh and the relative angular rate diminish their values. In other words, absolute value of digital value Q corresponding to the angular rate ωm of lens barrel unit 1 becomes less than Q1, and likewise, absolute value of digital value P corresponding to relative angle θx between lens barrel unit 1 and housing unit 2 becomes less than P4. Likewise, absolute value of digital value V corresponding to the relative angular rate between lens barrel unit 1 and housing unit 2 also becomes less than V2. As a result, the system detects the termination of the panning operation during the "completed-panning detection mode (186)" before the operation mode proceeds to the "control operation during still mode (181)" which lasts until the next panning operation is activated. As soon as the next panning operation begins, the system detects the activated panning operation via means for detecting the activated panning operation (183) in accordance with procedures described above, and the operation mode proceeds to "control operation during panning mode (184)" which lasts until means for detecting the termination of panning operation (186) detects the termination of panning operation.

Figure 13:
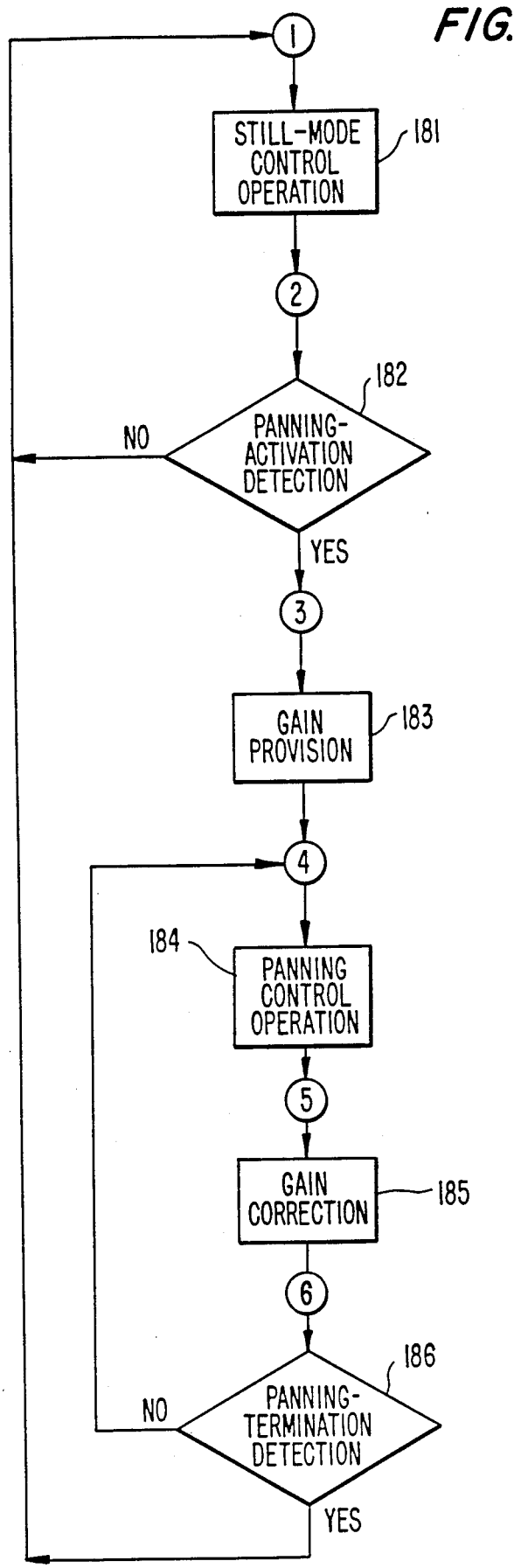
FIG. 13 is a basic flowchart showing another example of program applied to the operator unit.

Programs stored in the operator unit 23 reflecting the second preferred embodiment of the present invention are described below. FIG. 13 represents a basic flowchart of the operation executed by these programs. First, basic flowchart shown in FIG. 13 is described below. Note that numerals ① through ⑥ respectively represent nodes.

Step ① "Control operation during still mode (181)"

This program deals with synthetic means and corresponds to means for generating synthetic signals while taking video picture of a still object.

Step ② "Detection of the activated panning operation (182)"

This program deals with means for detecting the activated panning operation of "panning-operation detection means". This program detects the activation of panning operation. When panning operation is underway, program proceeds to step ③, and after panning operation is terminated, program returns to step ①.

Step ③ "Provision of gain (183)"

This program deals with gain-provision means of "panning-operation detection means". This program provides control gain in accordance with the condition when detecting the activated panning operation.

Step ④ "Control operation while panning operation is underway (184)"

This program deals with synthesizing means. This program corresponds to means for generating synthetic signals while panning operation is underway.

Step ⑤ "Modification of gain (185)"

This program deals with means for correcting gain. This program corrects the control gain in response to the movement of lens barrel unit 1 while panning operation is underway. In particular, this program causes the relative ratio to either increase or decrease itself by varying the synthetic ratio of digital signals from position-detector 11 and angular rate detector 12.

Step ⑥ "Detection of the termination of panning operation (186)"

This program deals with means for detecting termination of panning operation of panning-operation detection means.

This program allows the means to detect termination of panning operation. When panning operation is still underway, the operation mode is back to step ④, and it returns to step ① only after identifying that the panning operation is terminated. In the present preferred embodiment, means for detecting the panning operation is comprised of means for detecting activation of panning operation (182), and means for detecting termination of panning operation (186), respectively. Note that means for providing gain (183) is not compulsorily needed.

Like the first preferred embodiment of the present invention, the second preferred embodiment provides means for controlling operation during still mode (181), means for detecting the activation of panning operation (182), means for providing gain (183), means for controlling operation during panning mode (184), and means for detecting termination of the panning operation (186). In addition, the second preferred embodiment is provided with means for correcting gain (185).

Figure 14:
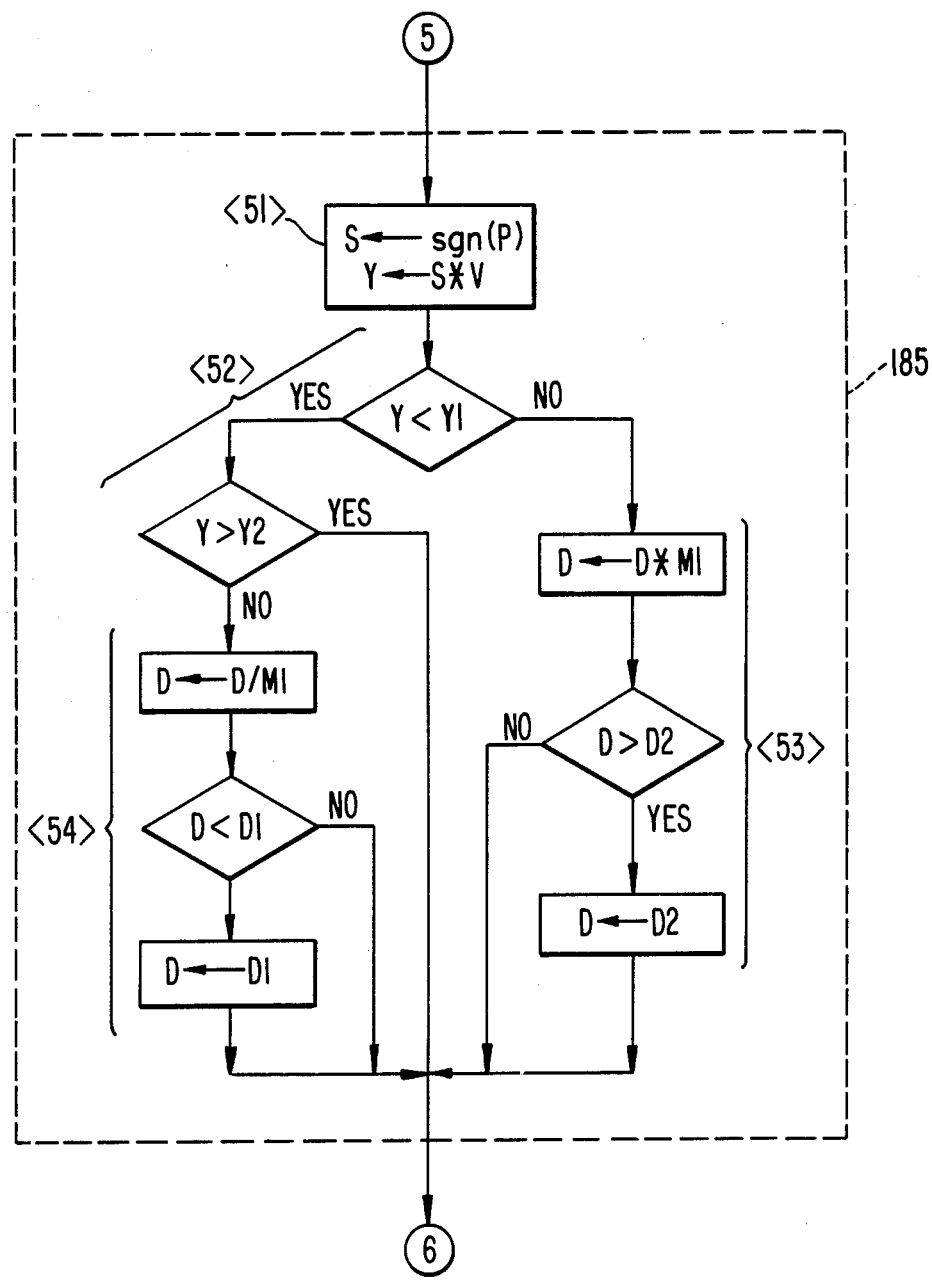
FIG. 14 is a flowchart showing an example of gain-corrected program applied to the operator unit.

Gain D was cited in the first preferred embodiment. However, as is clear from FIG. 10, D may be taken as the synthetic ratio of two signals in synthesizer unit 13. Accordingly, the following description refers to D as the synthetic ratio. FIG. 14 is the flowchart related to the operation of means for correcting gain (185).

Step <51>—Variable S is designated to be "1" while P remains positive. Variable S is designated to be "0" when P is "0" and S is designated to be "−1" when P is negative (S=sgn (P)). Next, S is multiplied by V to make up Y (Y=S·Y). Then, V corresponds to the value matching the relative angular rate which is the differentiated value of relative angle θh. On the other hand, when polarities of P and V match each other, Y is equal to |V|, whereas when polarity of P differs from that of V, Y is equal to −|V|.

Step <52>—When Y≧Y1 (where Y1 is the negative constant including "0") is established, operation mode proceeds to step <53>. When Y2<Y<Y1 (where Y2 is the negative constant) is established, operation mode proceeds to step 61 in conjunction with means for detecting termination of panning operation (186). When Y≦Y2 is established, operation mode proceeds to step <54>.

Step <53>—Synthetic ratio D is multiplied by M1 to make up new D (where D=D·M1). Note that M1 is constant which is greater than "1" like M1=1.1 for example. In other words, by applying the predetermined ratio M1, synthetic ratio D is expanded. If the synthetic ratio D is greater than D, D is converted into D2 by applying upperlimit restrictive means. Operation mode then proceeds to step <61> in conjunction with means for detecting termination of panning operation (186).

Step <54>—D is renewed by dividing synthetic ratio D into 1/M1 (D=D/M1). This reduces synthetic ratio D by applying the predetermined ratio M1. Then, if the synthetic ratio D is smaller than D1, D is converted into D1 by applying lower-limit restrictive means. Operation mode then proceeds to step <61> in conjunction with means for detecting termination of panning operation (186).

Program related to correction of gain (185) described above causes the synthetic ratio D (which is the relative ratio) to either increase or decrease itself in accordance with digital value V that corresponds to the relative angular rate. In particular, when V polarities of and P match each other, the synthetic ratio D is expanded. Conversely, if polarities of V and P differ from each other and V is greater than the predetermined value −Y2, the synthetic ratio D is reduced.

In this preferred embodiment, the panning-operation detection means detects that panning operation is underway, and then causes gain-correction means to vary synthetic ratio D in accordance with digital value V that corresponds to the relative angular rate so that relative ratio B·D/A can be either increased or decreased. Consequently, the relative ratio B·D/A during the panning operation becomes greater than the relative ratio B/A of the control operation under still mode, thus causing actuator 3 to generate a greater amount of torque Tm and allowing lens barrel unit 1 to accelerate its turning speed enough to follow up incremental rotation angle θx of housing unit 2 caused by panning operation. As a result, lens barrel unit 1 is securely prevented from colliding with housing unit 2.

Mechanism related to these operations is described below. Means for detecting the activation of panning operation of the panning-operation detection means detects the start-up of the panning operation by reading digital value P that corresponds to relative angle θh between lens barrel unit 1 and housing unit 2 and digital value V that corresponds to relative angular rate so that said means can identify that relative angle θh or the synthesized value of the relative angle and relative angular rate is out of the predetermined range. When the camera operator takes video picture of a still object with the video camera without performing panning operation, relative angle θh is subjected to negligible variation within a specific narrow range, and thus, the relative angular rate also remains negligible. While the still mode is present, absolute values of digital values P, V and W also remain minimal and operator unit 23 repeats performing the "control operation under still mode (181)". During this period, synthetic ratio D is "1". When the camera operator starts panning operation while these conditions are still present, since angle θh of lens barrel unit 1 still remains unchanged despite the increased angle θx of housing unit 2, absolute value of relative angle θh increases to cause absolute value of relative angular rate also increase. As a result, when digital value P and V respectively enter into the area for detecting the activated panning operation shown in FIG. 9 using program 182 "detection of the activated panning operation", the started panning operation is securely detected.

Program 183 related to the "provision of gain" causes synthetic ratio D corresponding to digital values P and V at the moment of the start of panning operation to be established, and then operation mode proceeds to control operations in conjunction with program 184 "control operation during panning". Normally, synthetic ratio D is provided with an initial value which is greater than "1". In reference to digital value V corresponding to the actual relative angular rate and by identifying variation of digital value P corresponding to the relative angle of the following moment, program 185 "correction of gain" allows the system to correct synthetic ratio D. For example, if digital values V and P are identical to each other, program 185 causes synthetic ratio D to expand to allow actuator 3 to generate a greater amount of torque Tm, thus generating an optimum torque matching digital values D·P. As a result, lens barrel unit 1 is driven by sufficient acceleration to allow angle θm of lens barrel unit 1 to expand by correctly following up the incremental angle θx of housing unit 2 caused by the panning operation performed. This securely prevents lens barrel unit 1 from colliding with housing unit 2. The value |P| is inhibited from increasing itself and conversely it starts to decrease.

If polarity of digital value V is different from that of P and has its absolute value |V| which is greater than the designated value |Y2|, synthetic ratio D is decreased so that the decreasing rate of P can be reduced. Consequently, digital value |P| gradually decreases toward "0" to prevent video picture from quickly shifting. This allows video picture to smoothly shift to the following scene throughout panning operation and provides extremely comfortable pictures to view.

Synthetic ratio D remains quite large while panning operation is underway, and as a result, angle θm of lens barrel unit 1 increases in proportion to the expanding angle θx of housing unit 2. Concretely, angular rate ωm of lens barrel unit 1 exactly or almost exactly matches an angular rate of housing unit 2 (viewed from inertia coordinate) generated by panning operation. Angular rate ωm is out of the designated range (|Q|>Q1).

After terminating panning operation, the camera operator starts to take video picture of the normal still object. When panning operation is terminated, angle θx of housing unit 2 rarely varies itself, and thus angle θm of lens barrel unit 1 is also apt to remain in the value identical to that of angle θx. This causes angular rate ωm of lens barrel unit 1 to be reduced to minimal values within a designated range or to zero, and in addition, relative angle θh and relative angular rate also diminish their values to a negligible level. Concretely, absolute value of digital value Q corresponding to angular rate ωm of lens barrel unit 1 is reduced to be less than Q1 ($|Q|<Q1$). Likewise, absolute value of digital value P corresponding to relative angle θx between lens barrel unit 1 and housing unit 2 is reduced to be less than P4 ($|P|<P4$). In the same way, absolute value of digital value V corresponding to relative angular rate between lens barrel unit 1 and housing unit 2 is reduced to be less than V2 ($V<V2$). This allows program 186 related to detection of the termination of panning operation to correctly detect the terminated panning operation, and as a result, operation mode proceeds to execution of program 181 related to the "control operation during still mode". Execution of program 181 related to the "control operation during still mode" continues until next panning operation begins. As soon as the camera operator starts with the next panning operation, program 182 related to the "detection of the activated panning operation" detects it in accordance with the procedures mentioned above, and then operation proceeds to execution of program 184 related to the "control operation during panning", which lasts until program 186 related to the "detection of the terminated panning operation" begins. In the foregoing preferred embodiment, program 185 related to "correction of gain" causes synthetic ratio D to either increase or decreases itself at a predetermined rate. It should be noted however that the spirit and scope of the present invention are not limitative of executing the preferred embodiment only.

Figure 15A:
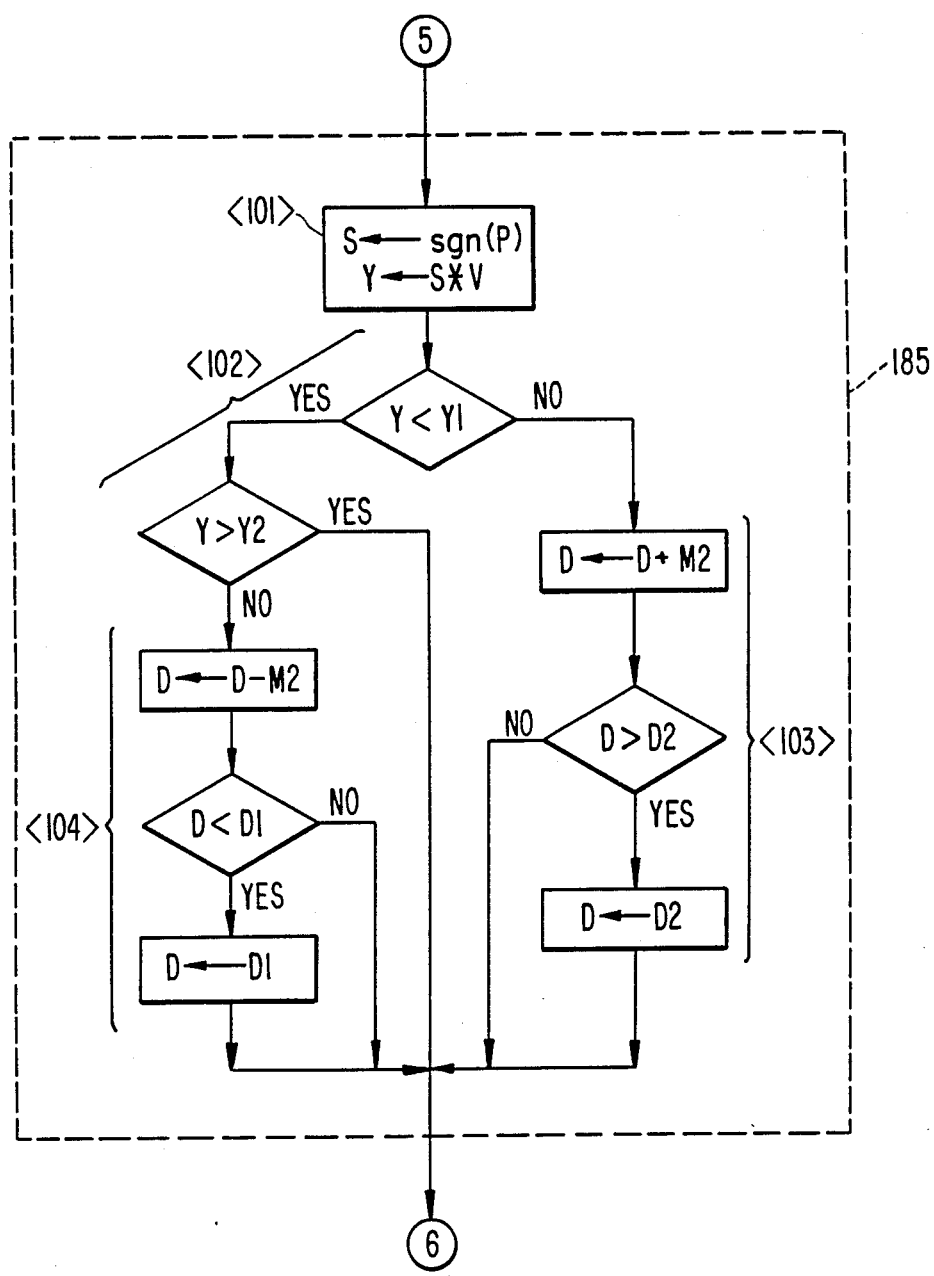
FIGS. 15(a) through (c) are respectively flowcharts showing other examples of gain-corrected programs applied to the operator unit.
Figure 15B:
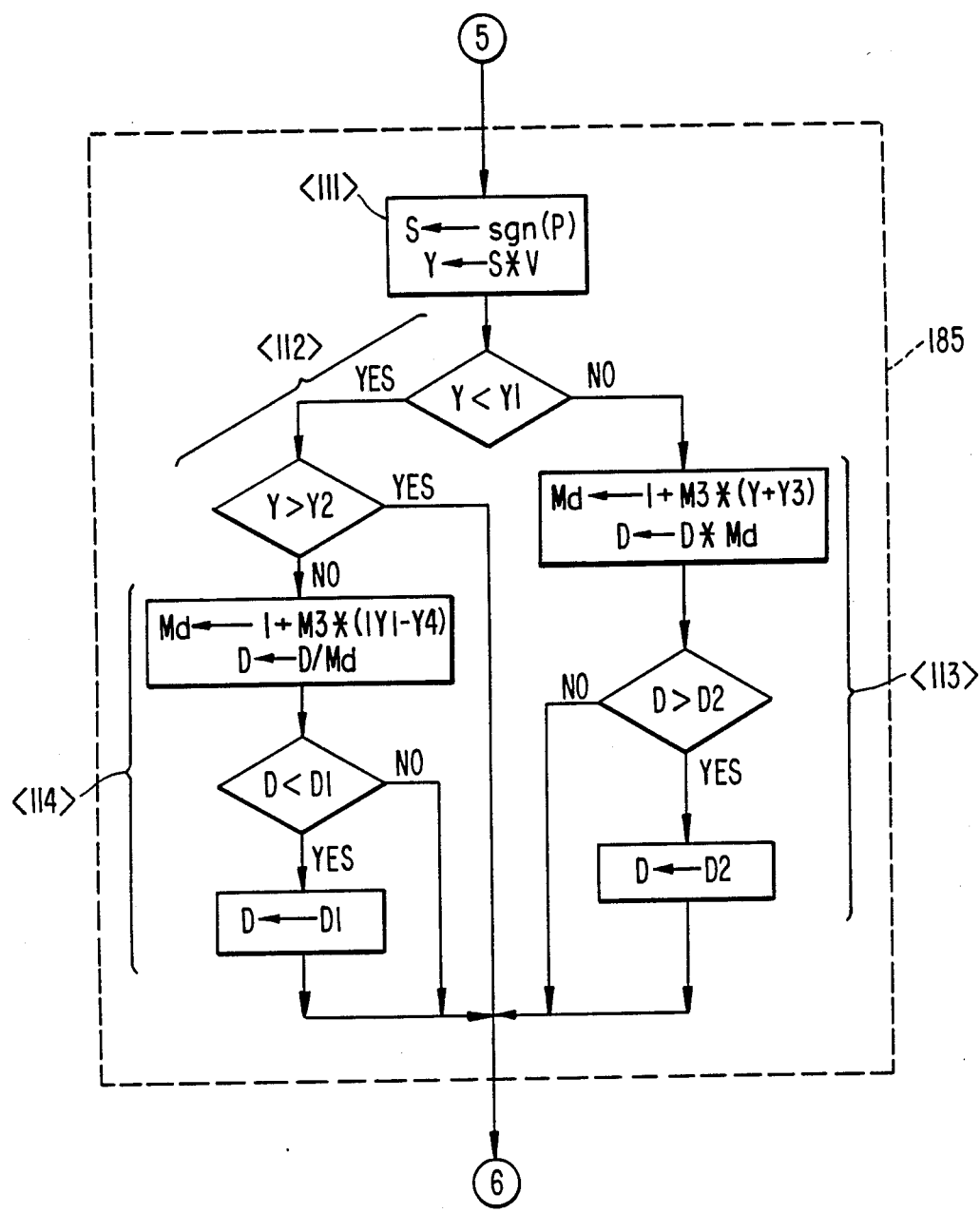
Figure 15C:
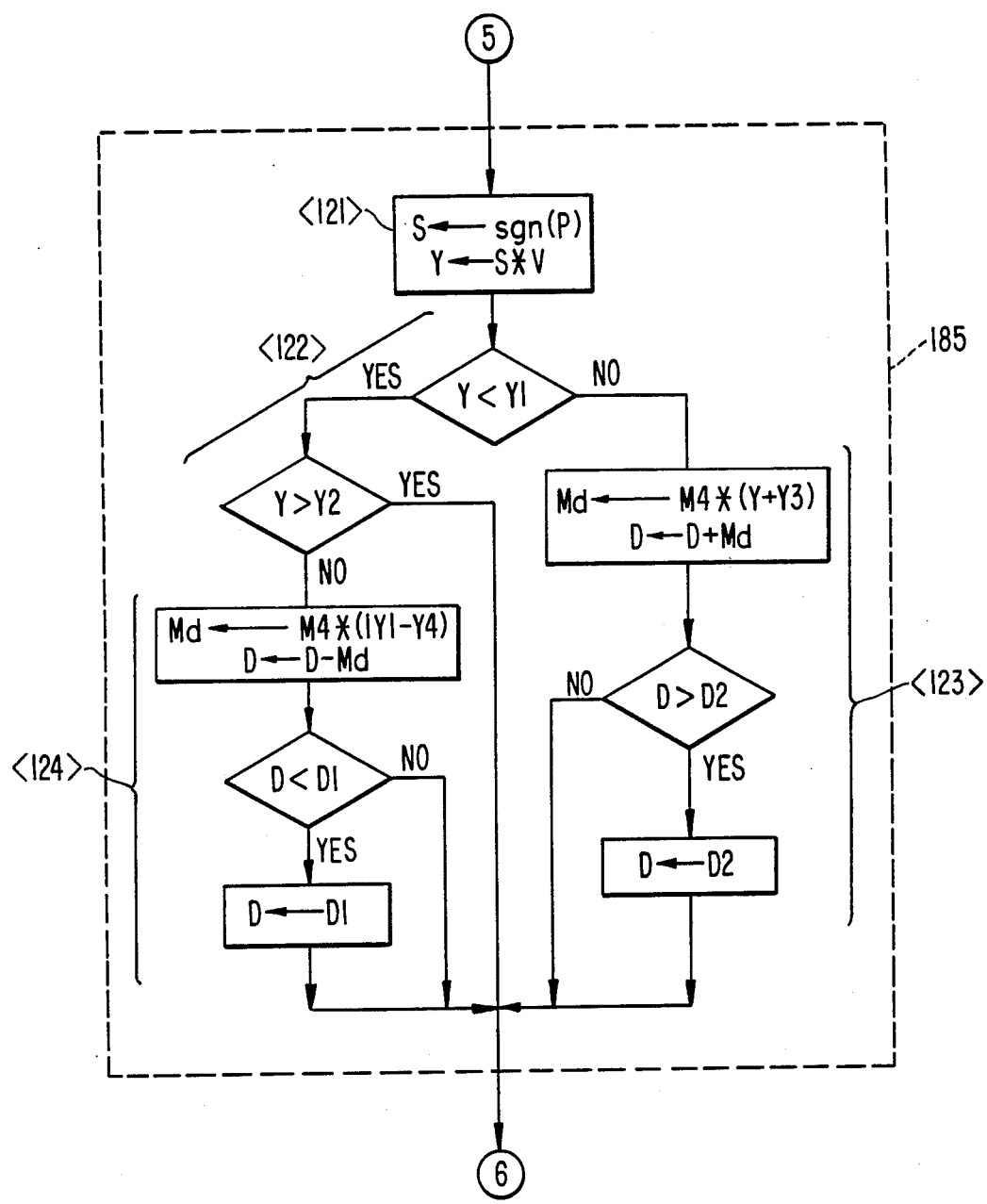

FIG. 15 (a) is a flowchart representing another preferred embodiment of program 185 related to the "correction of gain". In this example, synthetic ratio D either increases or decreases depending on a specific value. Operations of this flowchart are described below.

Step <101>—When P is positive, variable S is "1". When P is "0", variable S is also "0". When P is negative, variable S is reduced to "−1" ($S=\text{sgn}(P)$). Variable S is multiplied by V to make up Y ($Y=S\cdot V$).

Step <102>—When Y is greater than or equal to Y1 ($Y\geq Y1$) (where Y1 is constant including "0") containing O, operation mode proceeds to step <103>. If $Y2<Y<Y1$ (where Y2 is negative constant) is present, operation mode proceeds to step <61> in conjunction with the execution of program 186 "detection of the terminated panning operation". If $Y\leq Y2$ is present, operation mode proceeds to step <104>.

Step <103>—M2 is added to synthetic ratio D to make up new D ($D=D+M2$). M2 is constant which is less than "1" like M2=0.2 for example. In other words, by adding a specific value M2, synthetic ratio D increments itself. If D is greater than D2, D is converted into D2 by applying upper-limit restrictive means. Operation mode then proceeds to step <61> in conjunction with program 186 (detection of the terminated panning operation".

Step <104>—M2 is subtracted from synthetic ratio D to make up new D ($D=D-M2$). In other words, synthetic ratio D is reduced by M2 into less value. Then, if D is less than D1, D is converted into D1 by applying lower-limit restrictive means. Operation mode then proceeds to step <61> for executing program 186 "detection of the terminated panning operation".

FIG. 15 (b) represents a flowchart in conjunction with another embodiment of program 185 related to the "correction of gain". In this embodiment, synthetic ratio D is either increased or decreased by applying a specific rate in accordance with digital value Y related to relative angular rate (V). This is described below.

Step <111>—When P is positive, variable S is 1. Likewise, when P is "0", variable S is also "0". When P is negative, variable S is reduced to "−1" ($S=\text{sgn}(P)$). Variable S is multiplied by V to make up Y ($Y=S\cdot V$).

Step <112>—When $Y\geq Y1$ (where Y1 is negative constant including "0"), operation mode proceeds to step <113>. When $Y2<Y<Y1$ (where Y2 is negative constant) is present, operation mode proceeds to step <61> related to execution of program 186 "detection of the terminated panning operation". When $Y\leq Y2$ is present, operation mode proceeds to step <114>.

Step <113>—The sum of Y and Y3 (positive constant) is multiplied by M3 (where M3 is constant), the result of which is stored in Md after adding "1" to it ($Md=1+M3(Y+Y3)$). Synthetic ratio D is multiplied by Md to make up new D ($D=D\cdot Md$). Concretely, synthetic ratio D is magnified by multiplying ratio Md corresponding to the relative angular rate (V). When D is greater than D2, D is converted into D2 by applying upper-limit restrictive means. Finally, operation mode proceeds to step <61> for executing program 186 "detection of the terminated panning operation".

Step <114>—Y4 (positive constant) is first subtracted from $|Y|$, and then the result is multiplied by M3, the result of which is stored in Md after adding "1" to it ($Md=1+M3\cdot(|Y|-Y4)$). Then, synthetic ratio D is divided into 1/Md to make up new D ($D=1/Md$). This reduces synthetic ratio D by dividing it by ratio Md corresponding to the relative angular rate (V). When D is less than D1, D is converted into D1 by applying lower-limit restrictive means. Finally, operation mode proceeds to step <61> for executing program 186 "detection of the terminated panning operation".

FIG. 15 (c) represents a flowchart reflecting another preferred embodiment of program 185 in conjunction with the "correction of gain". In the present embodiment, synthetic ratio D is either increased or decreased by applying a specific value corresponding to digital value Y which is related to the relative angular rate (V). This is described below.

Step <121>—When P is positive, variable S is set to be "1". When P is "0", variable S is also "0". When P is negative, variable S is reduced to "−1" ($S=\text{sgn}(P)$). Variable S is multiplied by V to make up Y ($Y=S\cdot V$).

Step <122>—When $Y\geq Y1$ (where Y1 is negative constant including "0"), operation mode proceeds to step 123. When $Y2<Y<Y1$ (where Y2 is negative constant), operation mode proceeds to step <61> for executing program 186 "detection of the terminated panning operation". When $Y\leq Y2$ is present, operation mode proceeds to step 124.

Step <123>—The sum of Y and Y3 (positive constant) is first multiplied by M4 (where M4 is constant) and stored in Md ($Md=M4\cdot(Y+Y3)$). Md is added to synthetic ratio D to make up new D ($D=D+Md$). Concretely, synthetic ratio D is magnified by applying a specific value Md corresponding to the relative angular rate (V). Then, when D is greater than D2, D is converted into D2 by applying upper-limit restrictive means. Finally, operation mode proceeds to step >61> for executing program 186 "detection of the terminated panning operation".

Step <124>—Y4 (positive constant) is first subtracted from |Y|, and then the result is multiplied by M4 and stored in Md ($Md=M4\cdot(Y-Y4)$). New D is made up by subtracting Md from synthetic ratio D ($D=D-Md$). Concretely, synthetic ratio D is reduced into a less value by applying a specific value Md corresponding to the relative angular rate (V). Then, if D is less than D1, D is converted into D1 by applying lower-limit restrictive means. Finally, operation mode proceeds to step <61> for executing program 186 related to "detection of the terminated panning operation".

Figure 16:
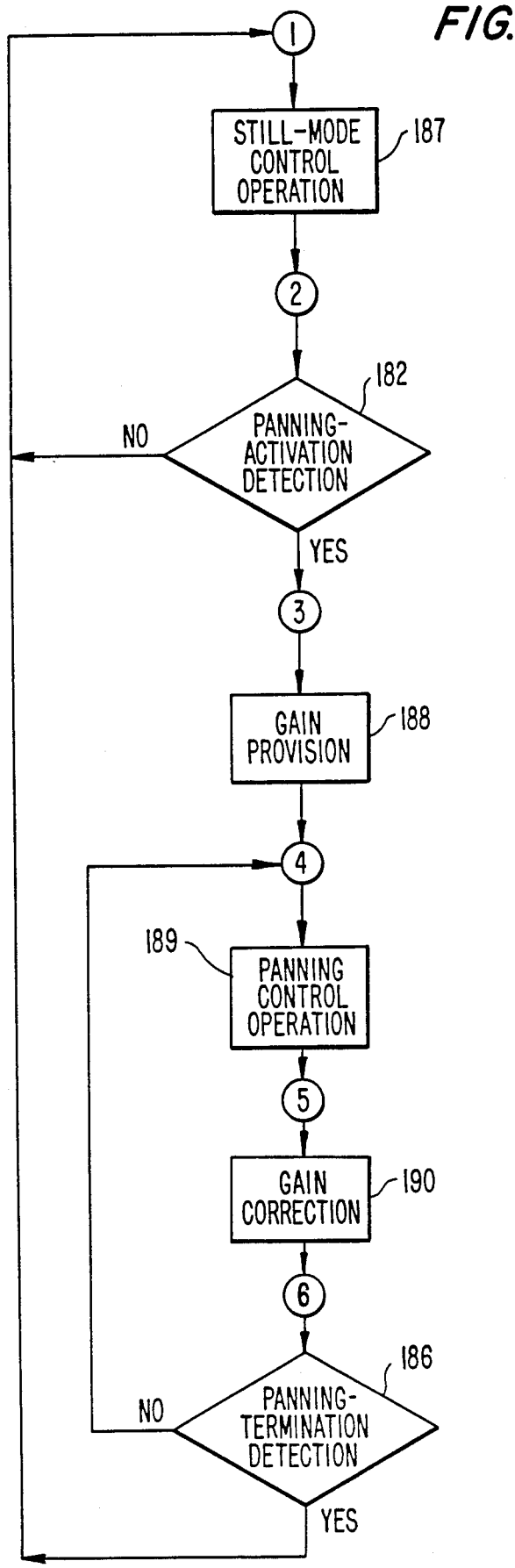
FIG. 16 is a basic flowchart showing still another example of program applied to the operator unit.
Figure 17A:
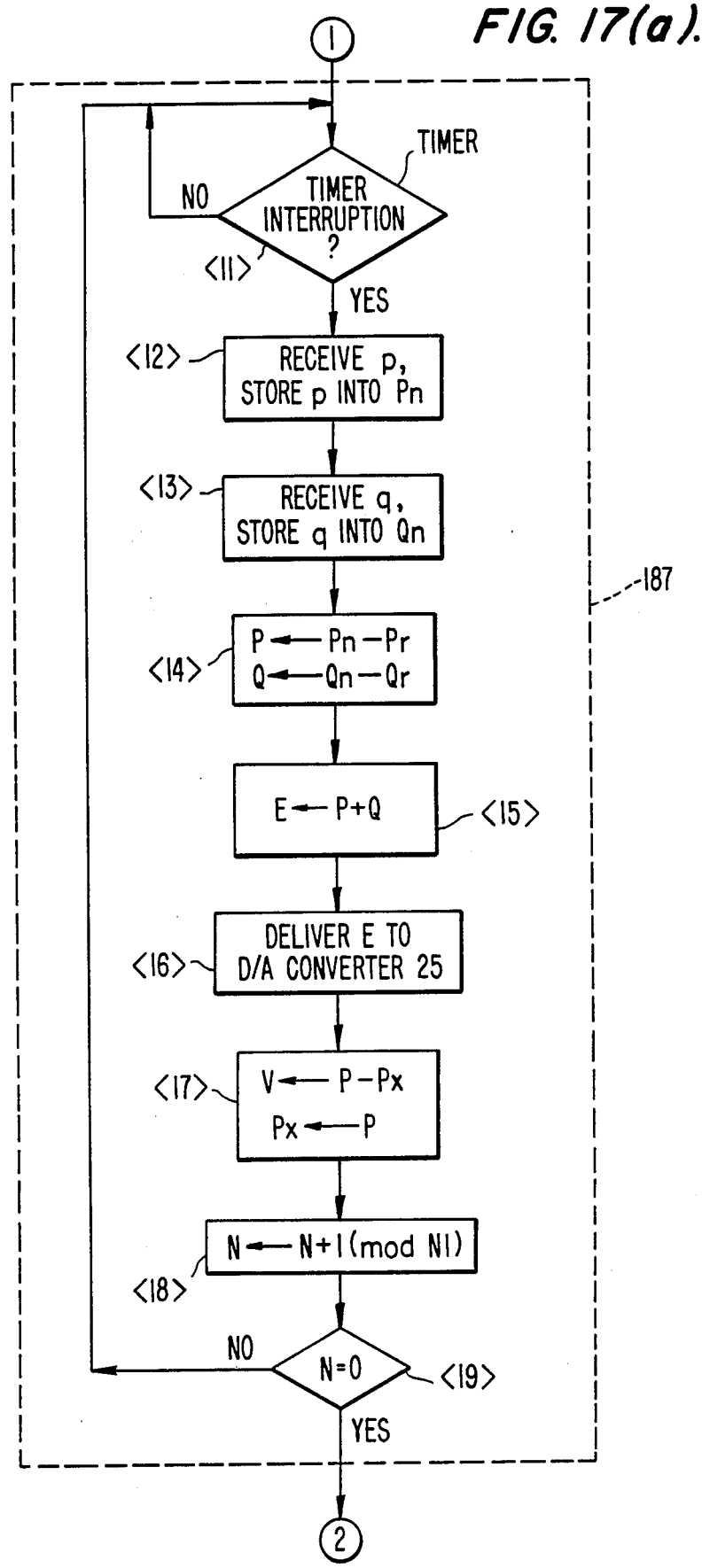
FIGS. 17(a) through (d) are respectively flowcharts showing programs applied to the operator unit for controlling the still mode operation, providing gain, controlling the camera system while panning is underway, and correcting gain.
Figure 17B:
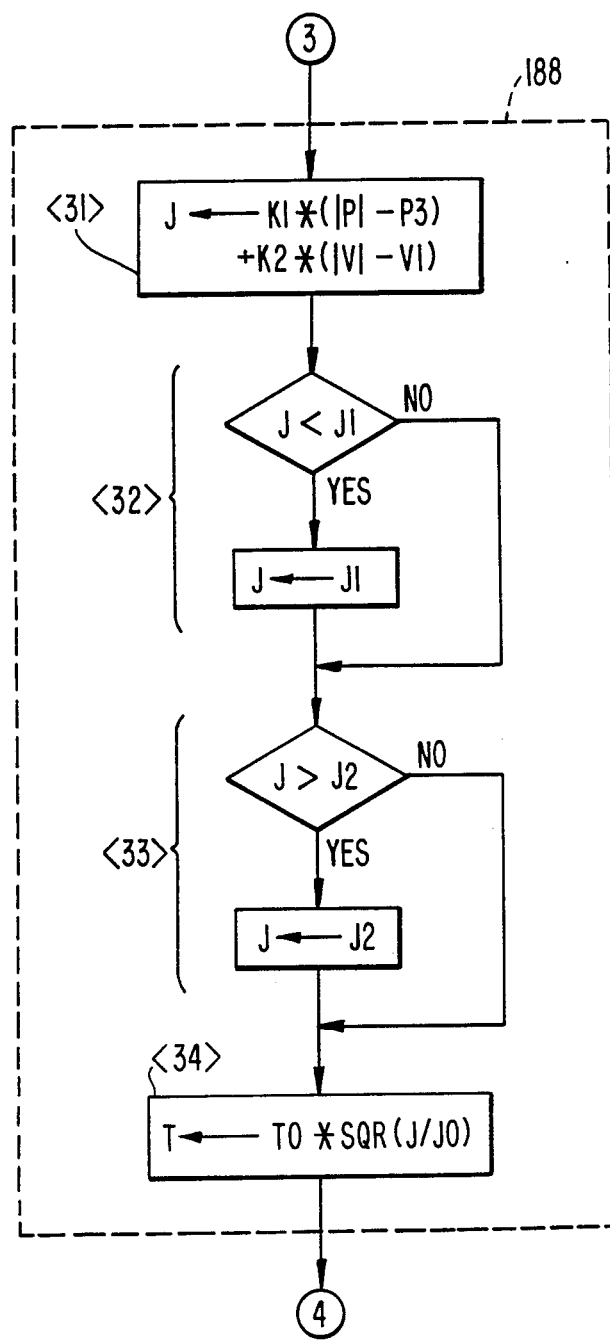
Figure 17C:
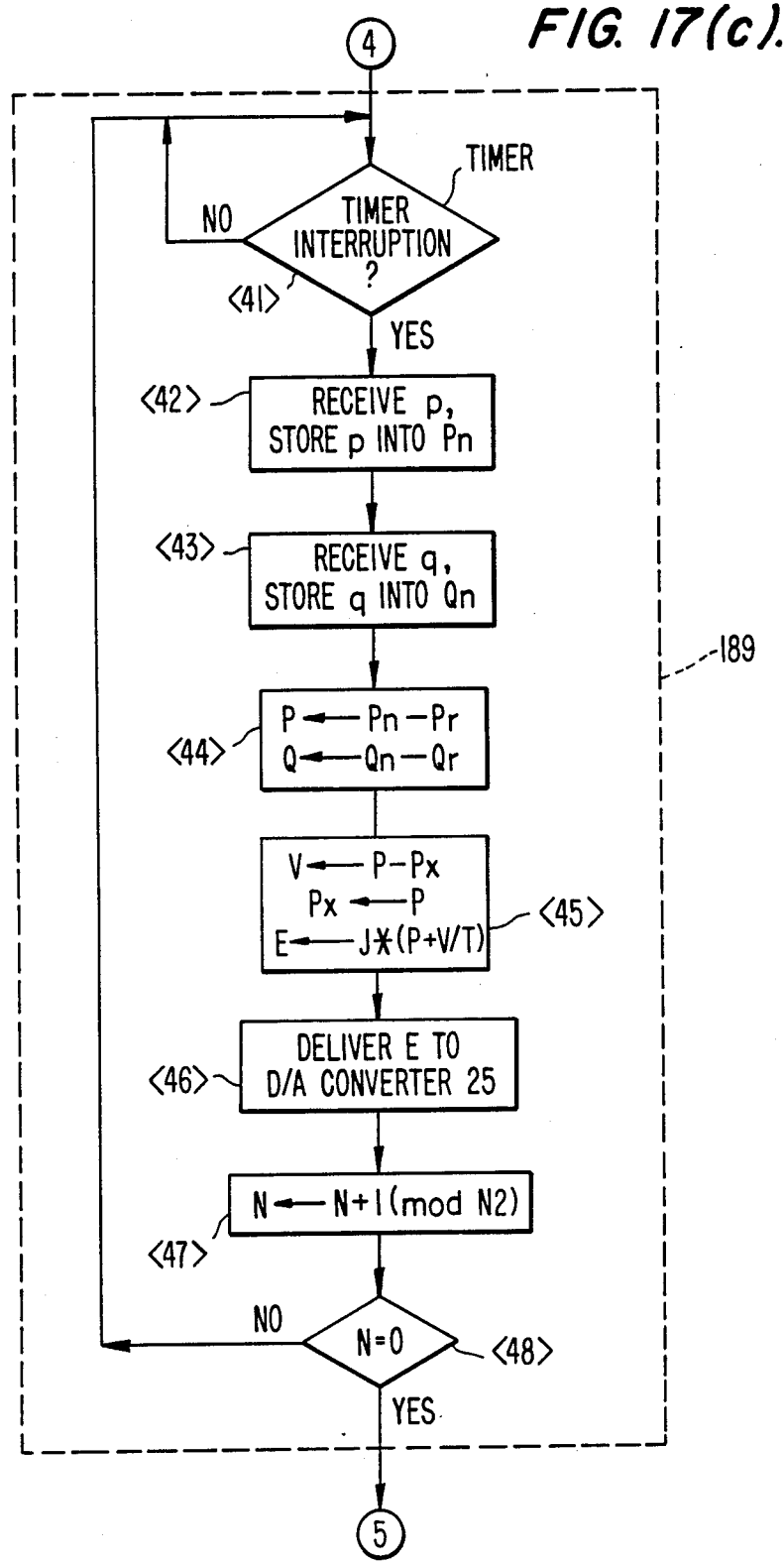
Figure 17D:
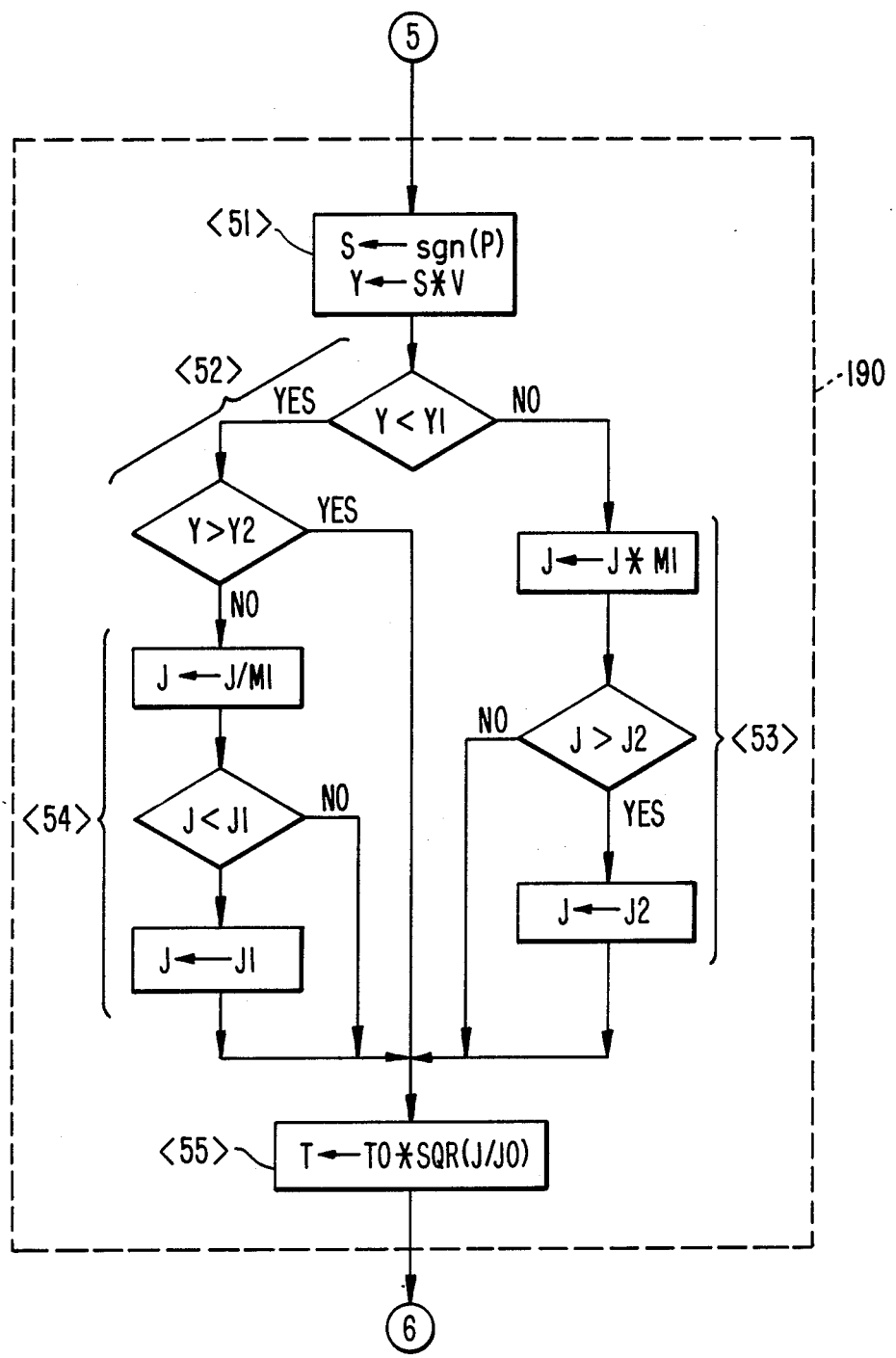

Next, operation of programs stored in operator unit 23 reflecting the third preferred embodiment of the present invention are described below. FIG. 16 represents a basic flowchart of the program operations of the third embodiment. FIGS. 17 (a) through (d) respectively show detailed flowcharts. First, the basic flowchart of FIG. 16 is described below. Note that numerals ① through ⑥ respectively denote nodes, each of these numerals exactly corresponds to those which are shown in FIG. 17.

Step ①—Program 187 "control operation during still mode"

This program deals with synthetic means. It corresponds to means for generating synthetic signals while the camera operator takes video picture of a still object.

Step ②—Program 182 "detection of the activation of panning operation"

This program deals with means for detecting the activated panning operation of the panning-operation detection means. When this operation mode is entered, the start-up of panning operation is detected. While panning operation is underway, operation mode proceeds to step ③. Operation mode returns to step ① when panning is not performed.

Step ③—Program 188 "provision of gain"

This program deals with gain-provision means of panning-operation detection means. This program establishes specific control gain in accordance with the actual condition when the activated panning operation is detected.

Step ④—Program 189 "control operation while panning is underway"

This program deals with operation-changing means and synthesizing means. It corresponds to means for generating synthetic signals while panning operation is underway.

Step ⑤—Program 190 "correction of gain"

This program deals with means for correcting gain and corrects gain ranging from relative angle $\theta h$ to the torque generated by actuator 3 in response to the movement of lens barrel unit 1 while panning operation is underway.

Step ⑥—Program 186 "detection of the termination of panning operation"

This program deals with means for detecting the terminated panning operation related to panning-operation detection means. When this mode is entered, the termination of panning operation is detected. Operation mode returns to step ④ when panning operation is underway, and it returns to step ① as soon as panning operation is terminated.

In the third preferred embodiment, the panning-operation detection means is comprised of means for detecting activated panning operation in conjunction with program 182, and means for detecting terminated panning operation related to program 186. Note that, means for providing gain related to program 188 is not compulsorily necessary.

Next, operation flowcharts related to respective means are described below.

Since operations related to program 182 "detection of activation of panning operation" and program 186 "detection of termination of panning operation" are respectively identical to program operations for detecting the activated panning operation and terminated panning operation employed for the first and second preferred embodiments described earlier, description of these is deleted from the present third embodiment.

FIG. 17 (a) represents a flowchart for executing program 187 related to the "control operation during still mode".

Step <11>—Awaits an interruption signal from timer which generates interruption signals at specific intervals (T1=every 10 msec.). When the receipt of the interruption signal is identified, operation mode proceeds to step <12>.

Step <12>—The digital signal "p" is received by holding signal "h" in "LOW" potential for a specific short period of time, and then digital signal "p" is stored into variable Pn.

Step <13>—The digital signal "q" is received by holding signal "k" in "LOW" potential for a specific short period of time, and then digital signal "q" is stored into variable Qn.

Step <14>—Operator unit subtracts reference value "Pr" from variable Pn ($P=Pn-Pr$) and then computes digital value P corresponding to relative angle $\theta h$ between lens barrel unit 1 and housing unit 2. Likewise, the operator unit subtracts reference value "Qr" from variable Qn ($Q=Qn-Qr$) and then computes digital value Q that corresponds to angular rate $\omega m$ of lens barrel unit 1 viewed from the inertia coordinate.

Step <15>—Operator unit adds up digital values P and Q by employing synthetic ratio "1" to produce synthesized digital value "E" ($E=P+Q$).

Step <16>—Operator unit delivers synthesized digital value "E" to D/A converter 25, which then converts it into analogue signal "e".

Step <17>—Operator unit subtracts Px from P to store the result into variable V ($V=P-Px$), and then converts digital value P into Px which was the value of P present T1 before (Px=P). Value V corresponds to the relative angular rate (differentiated value of relative angle $\theta h$) between the lens barrel unit 1 and the housing unit 2.

Step <18>—Operator unit adds 1 to the counting variable N by applying modulus N1 ($N=N+1$ (mod N1)). The sum of N and 1 is stored into N anew. If value of N is equal to N1, N is reduced to zero. In step <18>, N1=5.

Step <19>—If N is not "0", operation mode returns to step <11>. If N is 0, operation mode proceeds to program 182 "detection of the activated panning operation. System executes program 182 "detection of the activated panning operation" at specific intervals denoted by $N1 \cdot T1 = 50$ msec.

FIG. 17 (b) represents a flowchart related to execution of program 188 "provision of gain".

Step <31>—First, P3 (which is constant represented by P3≦P2) is subtracted from |P|, the result of which is then multiplied by K1 (where K1 is constant including "0"). Also, V1 (constant) is subtracted from |V|, the result of which is then multiplied by K2

(where K2 is constant including 0). Finally, gain J is provided by adding up these results ($J=K1\cdot(p-P3)+K2\cdot(|V|-V1)$).

Step <32>—If J is less than J1, J is converted into J1 by applying lower-limit restrictive means. Note that J1 is constant corresponding to 1 like J1 =1 for example.

Step <33>—If J is greater than J2, J is converted into J2 by applying upper-limit restrictive means, where J2 is constant which is considerably greater than 1 like J=25 for example.

Step <34>—Program 188 provides square root of the value produced by division of J by constant JO and then the result is multiplied by constant TO and stored into T ($T=TO\cdot SQR(J/JO)$). Note that SQR ( ) indicates "square root" ($\sqrt{\ }$).

Program 188 "provision of gain" provides initial values of gains J and T, which consist of a specific value corresponding to relative angle $\theta h$ and/or the relative angular rate at the moment when detecting the activated panning operation by applying initial-value provision means.

FIG. 17 (c) represents a flowchart related to program 189 "control operation during panning".

Step <41>—Awaits an interruption on signal from timer, which generates interruption signals at specific intervals (where I1=every 10 msec). Simultaneous with the receipt of interruption signals, operation mode proceeds to step <42>.

Step <42>—Operator unit receives digital signal "p" by holding signal "h" in "LOW" potential for a specific short period of time, and then stores digital signal "p" into variable Pn.

Step <43>—Operator unit receives digital signal "q" by holding signal "k" in "LOW" potential for a specific short period of time, and then stores digital signal "k" into variable Qn.

Step <44>—Operator unit subtracts the reference value "Pr" from variable Pn ($P=Pn-Pr$), and then computes digital value P corresponding to relative angle $\theta h$ between lens barrel unit 1 and housing unit 2. Likewise, operator unit subtracts the reference value "Qr" from variable Qn ($Q=Qn-Qr$), and then computes digital value Q corresponding to angular rate $\omega m$ of lens barrel unit 1 and viewed from the inertia coordinate.

Step <45>—Operator unit subtract Px from digital value P and stores the result into variable V ($V=P-Pn$). Digital value P is then converted into new Px (Px=P). Px denotes the value of P which was present T1 before. Variable V corresponds to the relative angular rate (which is differentiated value of relative angle $\theta h$) between lens barrel unit 1 and housing unit 2. The result of the division of variable V by T is then added to digital value P, and then the sum is multiplied by gain J to eventually generate synthetic value E ($E=J(P+V/T)$).

Step <46>—Operator unit delivers synthetic value E to D/A converter 25, where it is converted into analogue signal "e".

Step <47>—Numeral 1 is added to the counting variable N by applying modulus N2 ($N=N+1$ (mod N2)). The sum of N and 1 is newly stored in N. If the value of N is equal to N2, N is reduced to zero. In this step, N2=5.

Step <48>—If N is not "0", operation mode returns to step <41>. If N corresponds to "0", operation mode proceeds to step <51> for executing program 190 "correction of gain". Program 190 "correction of gain" is executed at 50 msec. intervals ($N2\cdot T1=50$ msec.). Unlike program related to the "control operation during still mode" (187), program 189 related to the "control operation during panning" executes its control operation by applying digital value P that corresponds to relative angle $\theta h$ and digital value V that corresponds to the relative angular rate which is the differentiated value of relative angle $\theta h$. Concretely, program 189 varies the operation of synthesizer 13 by activating operation changing means, and then controls designated operations by transmitting output signal "e" that responds only to the output signal from position-detector 11 to the driver unit 14.

FIG. 17 (d) represents a flowchart related to execution of program 190 "correction of gain".

Step <51>—Variable S is converted into "1" when digital value P is positive. When digital value P is "0", variable S is also reduced to "0". Variable S is reduced to "−1" when P is negative ($S=\text{sgn}(P)$). S is multiplied by V to make up Y ($Y=S\cdot Y$). Concretely, when polarities of P and V correctly match each other, value Y equals to $|V|$. If both polarities differ from each other, value Y equal to $-|V|$.

Step <52>—When $Y\geq Y1$ (which is negative constant including "0") is present, operation mode proceeds to step <53>. When $Y2<Y<Y1$ (where Y2 is negative constant) is present, operation mode proceeds to step <55>. When $Y\leq Y2$ is present, operation mode proceeds to step <54>.

Step <53>—Gain J is multiplied by M1 to generate new J ($J=J\cdot M1$), where M1 is constant which is greater than "1" like M1=1.1 for example. Concretely, gain J is magnified by applying a specific ratio M1. If J is greater than J2, J is converted into J2 by applying upper-limit restrictive means. Finally, operation mode proceeds to step <55>.

Step <54>—Gain J divided into 1/M1 to make up new J ($J=J/M1$). This reduces gain J to a specific level by applying predetermined ratio M1. Then, if J is less than J1, J is coverted into J1 by applying lower-limit restrictive means. Finally, operation mode proceeds to step <55>.

Step <55>—Program provides square root of the value produced by division of J by constant JO, and then the result is multiplied by constant TO and stored into T ($T=TO\cdot SQR(J/JO)$). Finally, operation mode proceeds to step <61> for executing program 186 "detection of the terminated panning operation".

Note that program 190 "correction of gain" causes gain J to either increases or decreases itself in response to digital value V that corresponds to relative angular rate. In particular, when polarities of V and P match each other, the program causes gain J to increase. If codes of V and P differ from each other and $|V|$ is greater than the predetermined value ($-Y2$), gain J is reduced to a lower level.

The third embodiment described above allows programs to detect that panning is still underway by applying the panning-operation detection means and then vary operations of synthesizer unit 13 under panning operation by applying the operation changing means so that synthetic signal "e" from synthesizer unit 13 can vary itself in response to signal "c" from position-detector 11 without being affected by signal "d" from angular rate detector 12, thus eventually improving overall characteristics related to control operation. Concretely, synthetic signal "e" from synthesizer 13 varies itself in response to relative angle $\theta h$ between lens barrel unit 1 and housing unit 2. In addition, programs made available for the present embodiment causes gain covering a range from relative angle $\theta h$ to torque Tm of actuator 3 to either increase or decrease by varying gain J in response to digital value V that corresponds to the relative angular rate by effectively applying the gain-correction means. This causes a greater gain to be generated while panning is underway, thus allowing actuator 3 to also generate greater torque Tm. Consequently, lens barrel unit 1 is provided with greater acceleration force enough to catch up with incremental rotation angle $\theta x$ of housing unit 2 generated by panning operation. This securely prevents lens barrel unit 1 from colliding itself with housing unit 2.

Functional features are described below. By identifying digital value P corresponding to relative angle $\theta h$ between lens barrel unit 1 and housing unit 2 and digital value V corresponding to the relative angular rate, means for detecting the activation of panning operation related to panning-operation detection means detects the start of panning operation by identifying that relative angle $\theta h$ is out of the predetermined range or the synthetic value of the relative angle and the relative angular rate is out of the predetermined range. While the camera operator takes video picture of a still object without panning the video camera, relative angle $\theta h$ keeps varying itself by negligible amount within a specific narrow range, and thus, the relative angular rate also remains minimal. In other words, absolute values of digital values P, V, and W remain quite negligible while operator unit 23 repeatedly performs program 187 for executing the "control operation under still mode".

When the camera operator starts with panning operation while the above condition is present, despite the increased rotation angle $\theta x$ of housing unit 2, angle $\theta m$ of lens barrel unit 1 still remains unchanged. As a result, absolute value of relative angle $\theta h$ increases itself, thus causing absolute value of relative augular rate to also increase. This allows digital values P and V to respectively enter into a specific area designated for detecting the activated panning operation under program 182 related to the detection of the activated panning operation shown in FIG. 9, thus allowing the system to detect that panning operation is actually underway.

Program 188 related to the "provision of gain" provides gains J and T respectively corresponding to digital values P and V that are present when panning operation is activated, and then operation mode proceeds to the execution of program 189 related to the "control operation during panning". Normally, gain J is provided with an initial value which is greater than 1.

Figure 18:
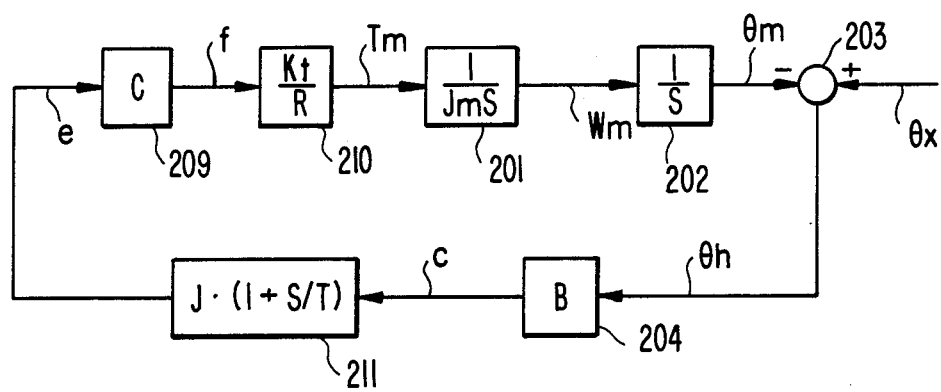
FIG. 18 is a schematic diagram showing an example of control operation when the control system detects that panning operation is underway.

FIG. 18 represents a simplified block diagram of the control system related to execution of program 189 "control operation during panning". According to the block diagram shown in FIG. 18, transfer function G' (s) from angle $\theta x$ of housing unit 2 to angle $\theta m$ of lens barrel unit 1 is denoted by the following:

$$G'(s) = \frac{B \cdot J \cdot L \cdot (1 + s/T)}{s \cdot s + (B \cdot J \cdot L/T) \cdot s + B \cdot J \cdot L} \quad (8)$$

Based on equations (9) and (10) shown below, equation (11) can be established.

$$\omega 3 = 2\pi \cdot f3 = (B \cdot J \cdot L) \quad (9)$$

$$\omega 4 = 2\pi \cdot f4 = T \quad (10)$$

$$f3 >> f4 \quad (11)$$

Figure 19:
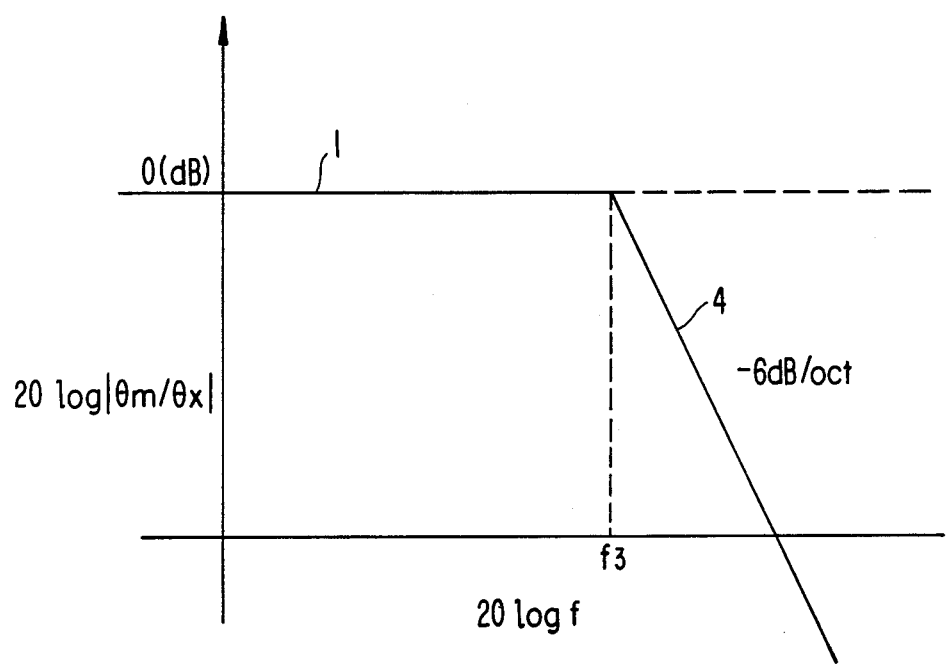
FIG. 19 is a Bode diagram showing another example of frequency characteristic of the transfer function from angle $\theta x$ of the camera housing to angle $\theta m$ of the lens barrel unit in the inertia coordinate.

FIG. 19 represents the frequency transfer characteristic G' (j) from angle $\theta x$ of housing unit 2 to angle $\theta m$ of lens barrel unit 1, where G' (j$\omega$) is denoted by broken-line approximation in conjunction with lines 1 and 4. It is understood from FIG. 19 that effective band of frequency transfer characteristic G' (J$\omega$) from $\theta x$ of housing unit 2 to angle $\theta m$ of lens barrel unit 1 can be expanded by increasing gain J as well as a break-point frequency f3.

Program 190 related to "correction of gain" corrects gain J by identifying the extent of variation of either digital value V corresponding to the relative angular rate or another digital value P that corresponds to the relative angle of the following moment. For example, if digital values V and P are of the identical polarity, this program 190 causes gains J and T to grow, thus allowing actuator 3 to generate a greater torque T related to gain J and digital value P. Consequently, lens barrel unit 1 is provided with sufficient acceleration force, thus causing angle $\theta m$ of lens barrel unit 1 to expand itself in proportion to the increased angle $\theta x$ of housing unit 2 caused by activated panning operation. As a result, lens barrel unit 1 can be securely prevented from colliding with housing unit 2. Concretely, growth of |P| is restained and conversely |P| eventually decreases. In addition, if digital value V has polarity which differs from that of digital value P and its absolute value V is greater than the predetermined value (Y2), program 190 reduces gain so that the decreasing rate of P can be reduced. As a result, |P| gradually decreases in the direction of zero, thus effectively preventing video picture from quickly shifting itself. This ensures smoother transfer of video picture while panning operation is underway, thus providing extremely comfortable picture to view.

Since gain J significantly grows throughout the panning operation, angle $\theta m$ of lens barrel unit 1 also grows in proportion to the increased angle $\theta x$ of housing unit 2. Concretely, angular rate $\omega m$ of lens barrel unit 1 exactly or almost exactly matches the angular rate of housing unit 2 (viewed from the inertia coordinate) generated by the panning operation, where angular rate $\omega m$ remains out of the predetermined range (|Q|>Q1).

After terminating panning operation, the camera operator takes video picture of the normal still object. When panning operation is terminated, since angle $\theta x$ of housing unit 2 rarely varies itself, and as a result, angle $\theta m$ of lens barrel unit 1 is apt to remain in a specific position identical to that of angle $\theta x$ of housing unit 2. As a result, angular rate $\omega m$ of lens barrel unit 1 is reduced to a minimal value within a specific range or to zero, and in addition, relative angle $\theta h$ and the relative angular rate are also reduced to minimal values, respectively. Concretely, absolute value of digital value Q corresponding to angular rate $\omega m$ of lens barrel unit 1 is reduced to be less than Q1 (|Q|<Q1). Likewise, absolute value of digital value P corresponding to relative angle $\theta x$ between lens barrel unit 1 and housing unit 2 is also reduced to be less than P4 (|P|<P4). Also, absolute value of digital value V corresponding to the relative angular rate between lens barrel unit 1 and housing unit 2 is reduced to be less than V2 (|V|$\leq$V2). Consequently, system controller detects the terminated panning operation by executing program 186 "detection of the terminated panning operation", allowing operation mode to proceed to execution of program 187 related to the "control operation during still mode". Execution of program 187 "control operation during still mode" lasts until next panning operation starts. When the camera operator starts with the next panning operation, program 182 "detection of the activated panning" correctly detects it in accordance with the operation procedures thus far described, and then operation mode proceeds to execution of program 189 "control operation during panning" which is then continuously executed until the terminated panning operation is detected by execution of program 186 "detection of the terminated panning operation".

This embodiment respectively causes gain J to be increased or decreased by a specific ratio in the execution of program 190 "correction of gain". It should be understood however that the spirit and scope of the present invention are not limitative of those cases described above.

Figure 20A:
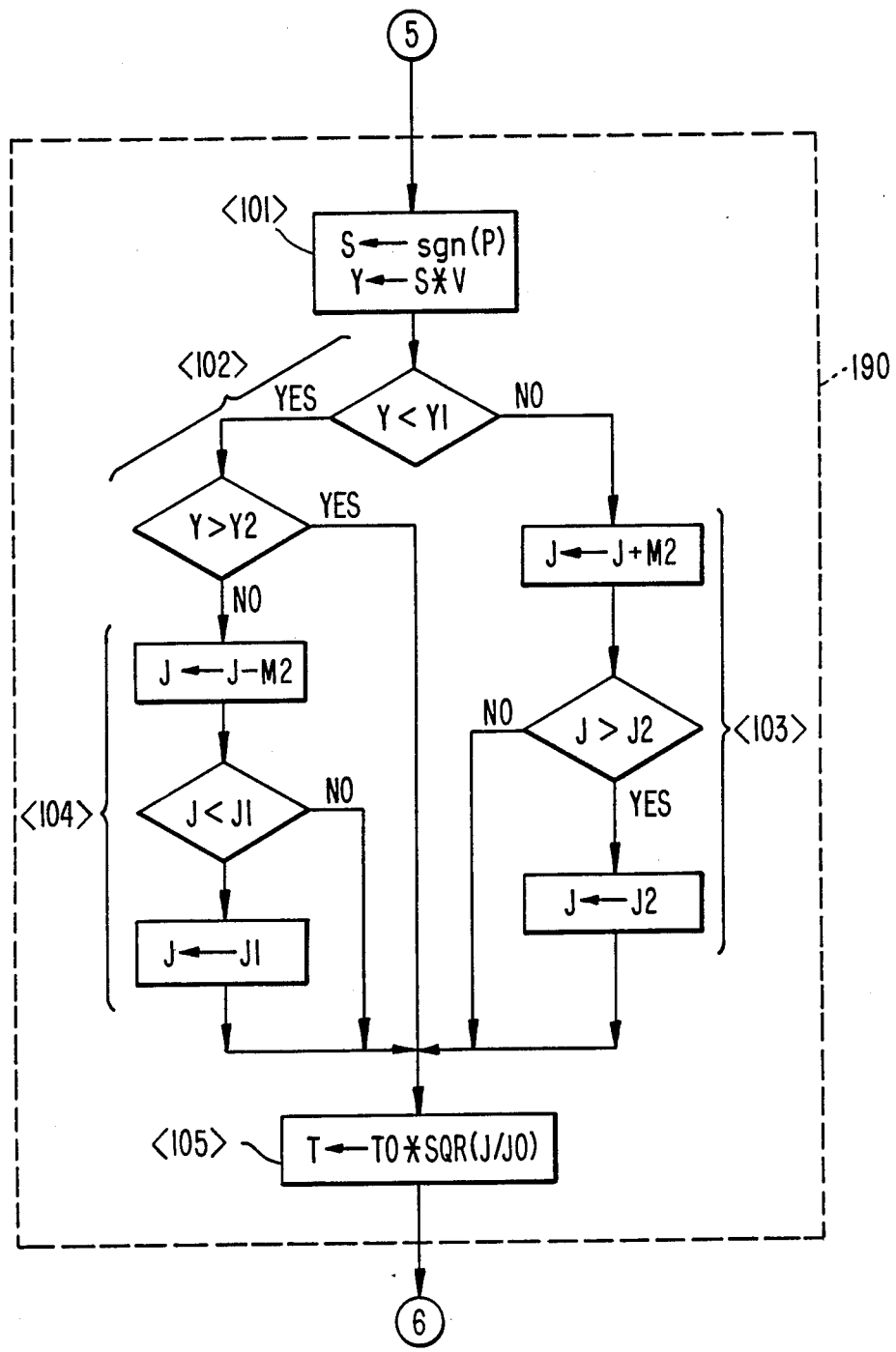
FIGS. 20(a) through (c) are respectively flowcharts showing other examples of programs related to the gain-correction.

FIG. 20(a) represents a flowchart reflecting a still further example of executing program 190 "correction of gain". In this example, gain J is either increased or decreased by applying a specific value. Procedures are described below.

Step <101>—When P is positive, variable S is designated to be "1". When P is "0", variable S is also "0". When P is negative, variable S is reduced to "−1" (S=sgn (P)). S is multiplied by V to make up Y ($Y=S \cdot V$).

Step <102>—When Y≧Y1 (Y1 is negative constant including "0") is present, operation mode proceeds to step <103>. When Y2<Y<Y1 (where Y2 is negative constant) is present, operation mode proceeds to step <105>. When Y≦Y2 is present, operation mode proceeds to step <104>.

Step <103>—M2 is added to gain J to make up new gain J ($J=J+M2$). M2 is constant which is less than "1" like M2=0.2 for example. Gain J is then magnified by applying specific value M2. If gain J is greater than J2, J is converted into J2 by applying upper-limit restrictive means. Finally, operation mode proceeds to step <105>.

Step <104>—M2 is subtracted from gain J to make up new gain J ($J=J-M2$). In other words, gain J is reduced by applying specific value M2. If gain J is less than J1, gain J is converted into J1 by applying lower-limit restrictive means. Finally, operation mode proceeds to step <105>.

Step <105>—Program 190 provides square root of the value which is produced by division of gain J by constant JO and then the result is multiplied by constant TO and stored into T ($T=TO \cdot SQR (J/JO)$). Finally, operation mode proceeds to step <61> for executing program 186 "detection of the terminated panning operation".

Figure 20B:
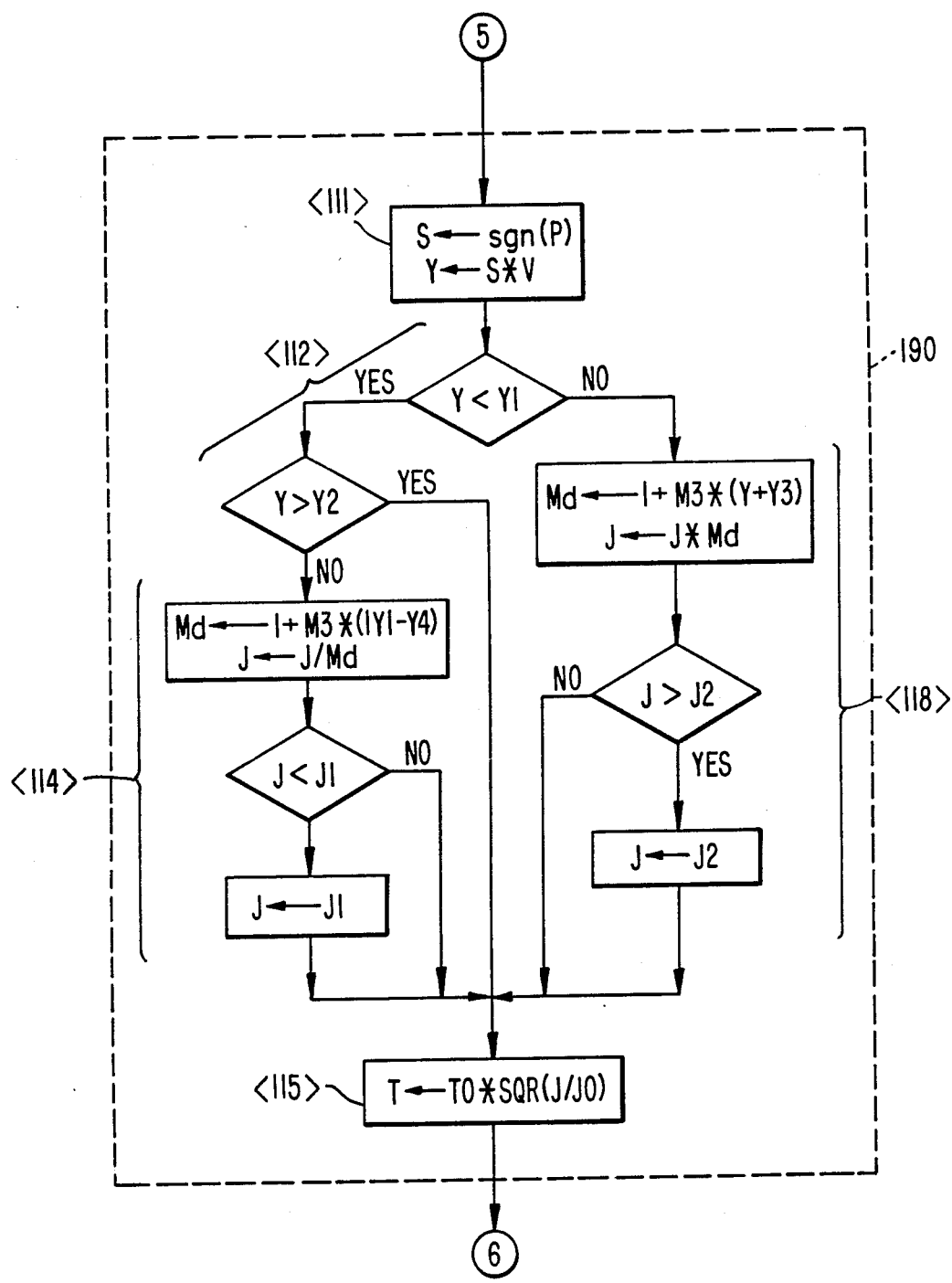

FIG. 20(b) represent another flowchart related to the execution of program 190 "correction of gain". In this embodiment, gain J is either increased or decreased by applying a specific ratio corresponding to digital value Y related to the relative angular rate (V). Procedures are described below.

Step <111>—When P is positive, variable S is designated to be "1". When P is "0", variable S is also "0". When P is negative, variable S is reduced to "−1" (S=sgn (P)). Then, S is multiplied by V to make up ($Y=S \cdot V$).

Step <112>—When Y≧Y1 (Y1 is negative constant including "0") is present, operation mode proceeds to step <113>. When Y2<Y<Y1 (where Y2 is negative constant), operation mode proceeds to step <115>. When Y≦Y2 is present, operation mode proceeds to step <114>.

Step <113>—The sum of Y and Y3 (positive constant) is multiplied by M3 (where M3 is constant), then "1" is added to the multiplied result, and the sum is stored into Md ($Md=1+M3 \cdot (Y+Y3)$). Then, gain J is multiplied by Md to make up new gain J ($J=J \cdot Md$). Concretely, gain J is magnified by applying a specific ratio Md that corresponds to the relative angular rate (V). Then, if J is greater than J2, gain J is converted into J2 by applying upper-limit restrictive means. Finally, operation mode proceeds to step <115>.

Step <114>—The result of the subtraction of Y4 (positive constant) from |Y| is multiplied by M3. 1 is added to the multiplied result and the sum is stored into Md ($Md=1+M3 \cdot (|Y|-Y4)$). Next, gain J is divided into 1/Md so that new gain J is produced ($J=J/Md$). Concretely, gain J is reduced by applying a specific ratio Md which corresponds to the relative angular rate (V). Then, if J is less than J1, gain J is converted into J1 by applying lower-limit restrictive means. Finally, operation mode proceeds to step <115>.

Step <115>—This program provides square root of the value which is produced by division of gain J by constant JO and then the result is multiplied by constant TO, and stored into T ($T=TO \cdot SQR (J/JO)$). Finally, operation mode proceeds to step <61> for executing program 186 "detection of the terminated panning operation".

Figure 20C:
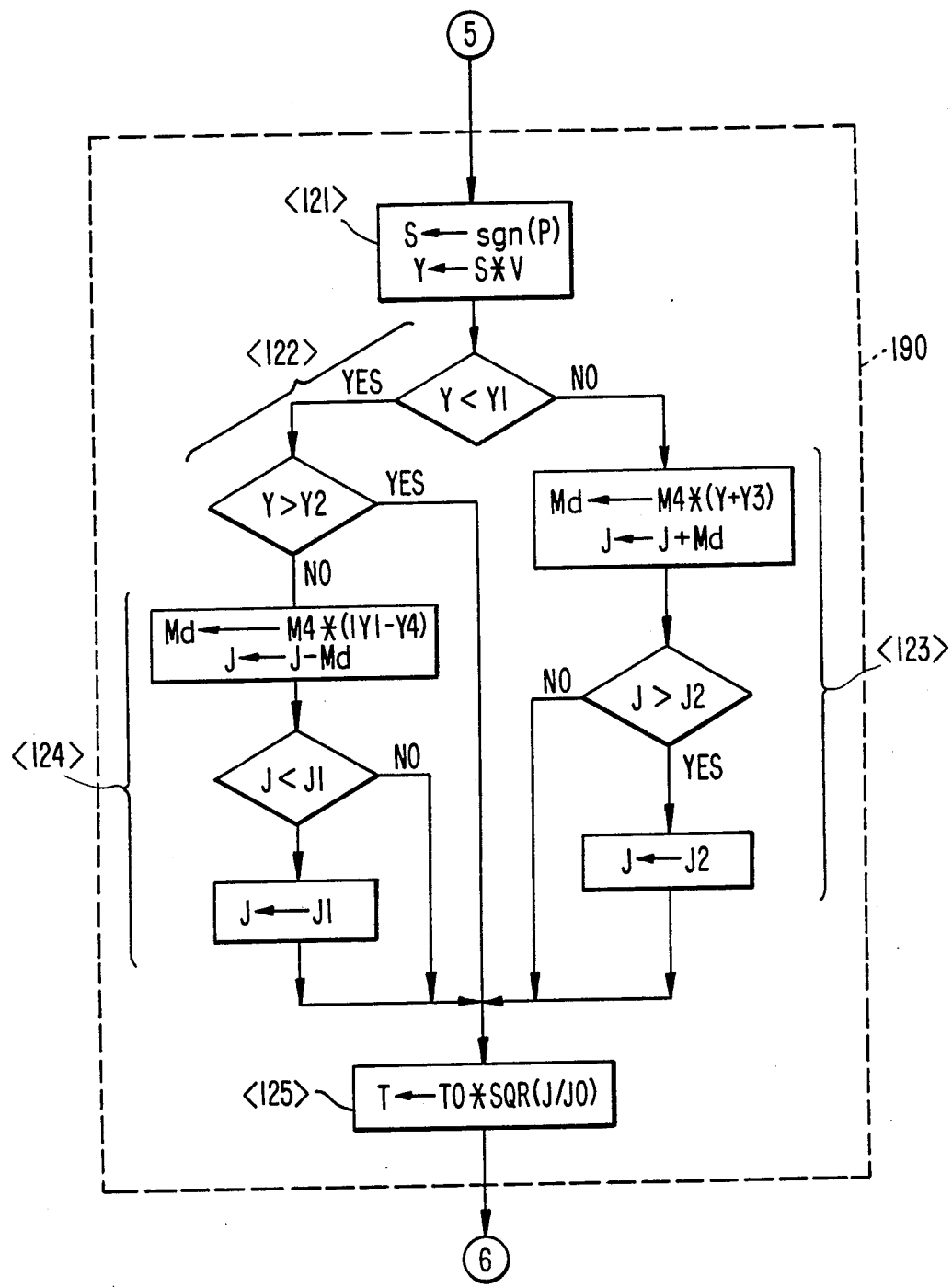

FIG. 20(c) represents still another flowchart related to execution of program 190 "correction of gain". In this embodiment, gain J is either increased or decreased by applying a specific value corresponding to digital value Y related to the relative angular rate (V). Procedures are described below.

Step <121>—When P is positive, variable S is designated to be "1". When P is "0", variable S is also "0". When P is negative, variable S is reduced to "−1" (S=sgn (P)). S is multiplied by V to make up digital value Y ($Y=S \cdot V$).

Step <122>—When Y≧Y1 (which is negative constant including "0") is present, operation mode proceeds to step <123>. When Y2<Y<Y1 (where Y2 is negative constant), operation mode proceeds to step <125>. When Y≦Y2 is present, operation mode proceeds to step <124>.

Step <123>—The sum of Y and Y3 which is positive constant is multiplied by M4 (where M4 is constant) and stored into Md ($Md=M4 \cdot (Y+Y3)$). Then, Md is added to gain J to make up new gain J ($J=J+Md$). Concretely, gain J is magnified by applying a specific value Md corresponding to the relative angular rate (V). If gain J is greater than J2, gain J is converted into J2 by applying upper-limit restrictive means. Finally, operation mode proceeds to step <125>.

Step <124>—The result of subtraction of Y4 (positive constant) from |Y| is multiplied by M4 and stored into Md ($Md=M4 \cdot (|Y|-Y4)$). Md is subtracted from gain J to make up new J ($J=J-Md$). Concretely, gain J is reduced by applying a specific value Md corresponding to the relative angular rate (V). If gain J is less than J1, gain J is coverted into J1 by applying lower-limit restrictive means. Operation mode then proceeds to step <125>.

Step <125>—This program provides square root of the value which is produced by division of gain J by constant JO and then the result is multiplied by constant TO and stored into T ($T=TO \cdot SQR(J/JO)$). Finally, operation mode proceeds to step <61> for executing program 186 "detection of the terminated panning operation". The foregoing first, second, and third embodiments of the present invention respectively allow gain covering from relative angle $\theta h$ to torque Tm of actuator 3 to be either increased or decreased by varying gains J and T of synthesizer unit 13. It should be understood however that the spirit and scope of the present invention are not limitative of those embodiments thus far described. For example, gain of the driver unit 14 may also be increased or decreased as part of means embodied by the present invention.

Program 182 relates to execution of the "detection of the activated panning operation" cited in the first, second, and third preferred embodiments causes detection means to detect the activation of panning operation by identifying entry of digital value P corresponding to relative angle $\theta h$ and digital value V corresponding to the relative angular rate into shadow-lined area shown in FIG. 9. However, spirit and scope of the present invention are not limitative of these embodiments.

Figure 21A:
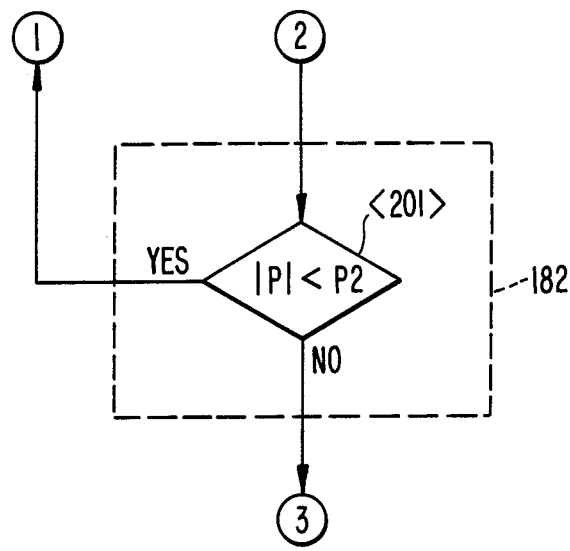
FIGS. 21(a) through (b) are respectively flowcharts showing other examples related to the detection of the activation of panning operation.

FIG. 21(a) represents another flowchart related to the execution of program 182 "detection of the activated panning operation". In this additional embodiment, the detection means detects the activated panning operation by identifying that relative angle $\theta h$ (P) is out of a specific range. Procedures are described below.

Step <201>—If constant P2 is greater than |P|(P<P2), operation mode returns to the execution of the "control operation during still mode". If |P|<P2 is not present, operation mode proceeds to the "provision of gain".

Figure 21B:
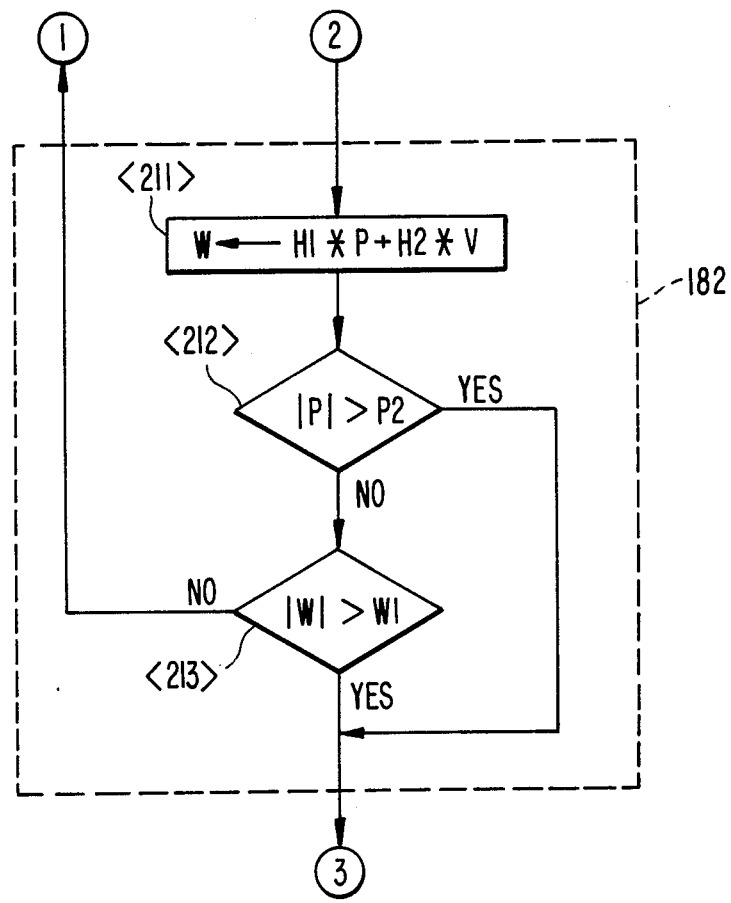

FIG. 21(b) represents a still another flowchart related to the execution of program 182 "detection of the activated panning operation". In this additional embodiment, unlike a specific area for allowing the detection means to detect the activated panning operation shown in FIG. 9, the detection means detects the activated panning operation by identifying that either relative angle $\theta h$ (P) or the synthetic value (W) of the relative angle (P) and the relative angular rate (V) is out of the predetermined range. These operations are described below.

Step <211>—Results of multiplying P by H1 (where H1 is constant) and V by H2 (where H2 is also constant) are added together and then stored into variable W ($W = H1 \cdot P + H2 \cdot V$).

Step <212>—When |P|>P2 (constant) is present, operation mode proceeds to execution of the "provision of gain". If P>P2 is not present, operation mode proceeds to step <213>.

Step <213>—When |W|>W1 (constant) is present, operation mode proceeds to execution of the "provision of gain". If W>W1 not present, operation mode returns to execution of the "control operation under still mode".

Execution of program 186 "detection of the terminated panning operation" employed by the foregoing preferred embodiments allows the detection means to detect the terminated panning operation by identifying diminished absolute values of digital value Q corresponding to angular rate $\omega m$, digital values P corresponding to relative angle $\theta h$, and digital value V corresponding to the relative angular rate, respectively. The spirit and scope of the present invention are not limitative of these embodiments as in the foregoing preferred embodiments.

Figure 22A:
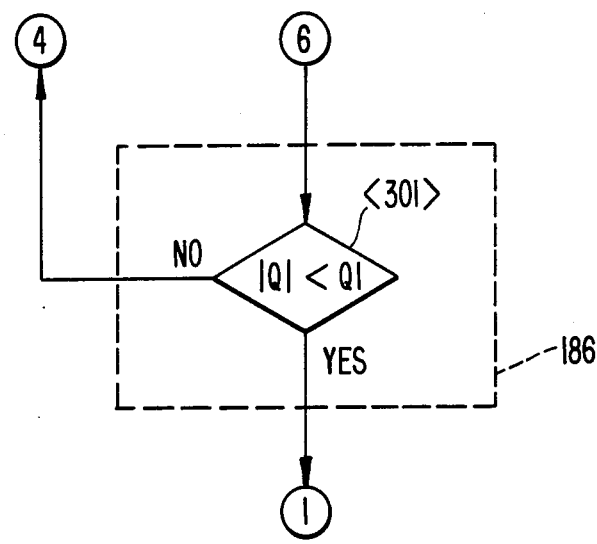
FIGS. 22(a) and (b) are respectively flowcharts showing other examples of programs related to the detection of the completion of panning operation.

FIG. 22(a) represents another flowchart related to execution of program 186 "detection of the terminated panning operation". In this embodiment, the detection means detects the terminated panning operation by identifying that angular rate $\omega m$ of lens barrel unit 1 viewed from the inertia coordinate is within a specific range. Operation are described below.

Step <301>—When |Q|<Q1 (constant) is present, operation mode returns to execution of the "control operation under still mode". When |Q|<Q1 is not present, operation mode returns to the "control operation during panning".

Figure 22B:
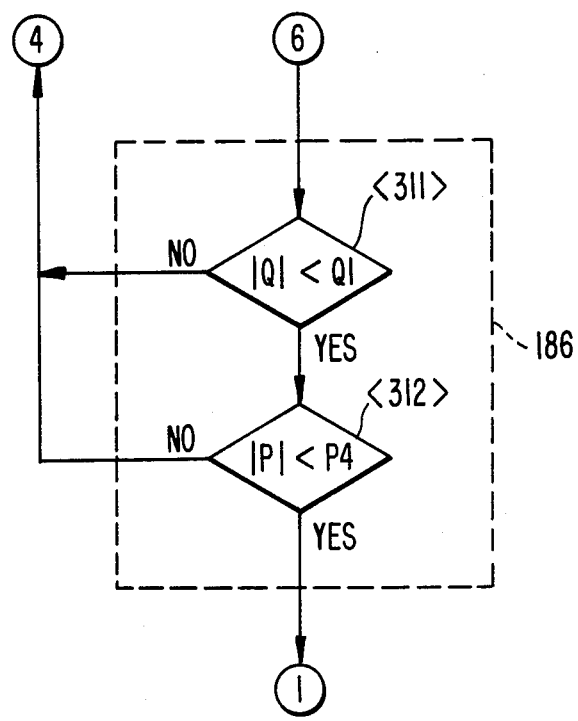

FIG. 22(b) represents another flowchart related to the execution of program 186 "detection of the terminated panning operation". In this additional embodiment, the detection means detects the terminated panning operation by identifying that both angular rate $\omega m$ (Q) and the relative angle $\theta h$ (P) are within a specific range, respectively. Operations are described below.

Step <311>—When Q<Q1 (constant) is present, operation mode proceeds to step <312>. When Q<Q1 is not present, operation mode then returns to the "control operation during panning".

Step <312>—When P<P4 (constant) is present, operation mode returns to the "control operation under still mode". When P<P4 is not present, operation mode then returns to the "control operation during panning".

In the foregoing preferred embodiments, the relative angular rate is detected by applying digital value V which is derived from the differentiated digital value P that corresponds to relative angle $\theta h$. It should be understood that the spirit and scope of the present invention are not limitative of these embodiments. For example, operation of synthesizer unit 13 may be varied so that operation can be controlled by synthesizing the sum of signals from the position-detector and the relative angular rate detector under the panning operation by installing said detector for specifically detecting the relative angular rate between lens barrel unit 1 and housing unit 2. This also makes up part of means reflecting the preferred embodiments of the present invention. Conversely, if operation of the synthesizer unit is controlled merely by applying signal from the position-detector then the system dispenses with the relative angular rate detector, thus offering an advantage for simplifying the constitution of the system as well. Furthermore, the vibration-preventive mechanism of the video camera incorporating the preferred embodiments of the present invention provides a great convenience for realizing compact-size and light-weight configuration of the entire system. The video camera incorporating the preferred embodiments of the invention uses less number of sensor means, thus offering inexpesive cost advantage. In addition, since the video camera reflecting the present invention correctly detects relative positions of various requirements by effectively activating hall element means (which is substantially magnetic flux sensing elements) for detecting magnetic field of the magnet, constitution of the detection means is extremely simplified, thus featuring less part requirements. The present invention allows use of various means for detecting magnetic field such as hall elements, magnetic-resistant elements, or per-saturated reactors for example. In particular, according to the present invention, both the panning-operation detection means and the gain-correction means can easily be made up, while the present invention securely prevents lens barrel unit from colliding with housing unit while the panning operation is underway. Needless to say that applicability of the present invention is not limited to video cameras only, but is is also applicable to a variety of potential objects as well. It will be apparent to those who are skilled in the art that various changes and modifications may be made therein without departing from the spirit and scope of the present invention as defined in the appended claims.

What is claimed is:

1. A camera apparatus comprising;
   a lens barrel unit mounting therein an image-pickup element;
   picture-signal processing means for generating a video signal from an electrical signal produced by image-pickup element;
   support unit that supports said lens barrel unit rotatably about a rotation shaft thereof that crosses an axis of incident light entering into said lens barrel unit generally perpendicularly;
   actuator means installed between said lens barrel unit and said support unit for rotating said lens barrel unit;
   position-detection means for detecting a relative angle between said lens barrel unit and said support unit;
   angular rate detection means for detecting an angular rate of said lens barrel unit about said rotation shaft viewed from an inertia coordinate;
   synthesizing means for producing a signal in response to output signals of said position-detection means and said angle-speed detection means;
   driver means for supplying power to said actuator means in response to said signal from said synthesizing means;
   panning-operation detection means for detecting that panning operation is underway;
   synthesizer-operation changing means for varying operations of said synthesizing means in accordance with an operative state of said panning-operation detection mean; and
   means for first activating operation of said synthesizer-operation varying means as soon as said panning-operation detection means detects the activated panning operation and then causes specific driving force to be applied to said lens barrel unit corresponding to the actual condition of panning operation after varying operation of said synthesizing means.

2. The camera apparatus defined in claim 1, in which said panning-operating detection means is substantially comprised of means for detecting start-up of panning operation and means for detecting termination of panning operation.

3. The camera apparatus defined inn claim 2, in which panning-operation start-up detection means detects the activated panning operation by identifying that a relative angle between said lens barrel unit and support unit is out of a predetermined range.

4. The camera apparatus defined in claim 2, in which said panning start-up detection means detects the activated panning operation by identifying that a relative angle between said lens barrel unit and support unit or a synthesized value of relative angular rate and a relative angle between said lens barrel unit and support unit is out of a predetermined range.

5. The camera apparatus defined in claim 3, in which said panning start-up detection means detects the relative angle between said lens barrel unit and support unit by receiving a signal from said position-detection means.

6. The camera apparatus defined in claim 2, in whih terminated panning detection means detects a terminated panning operation by identifying that the angular rate of said lens barrel unit viewed from the inertia coordinate is within a predetermined range.

7. The camera apparatus defined in claim 6, in which said terminated panning detection means detects the angular rate of said lens barrel unit viewed from the inertia coordinate by receiving a signal from said angular rate detection means.

8. The camera apparatus defined in claim 2, in which terminated panning detection means detects a terminated panning operation by identifying that the angular rate of said lens barrel unit viewed from the inertia coordinate and the relative angle between said lens barrel unit and support unit are respectively within predetermined ranges.

9. The camera apparatus defined in claim 2, in which terminated panning detection means detects a terminated panning operation by identifying that an angular rate of said lens barrel unit viewed from the inertia coordinate, a relative angular rate between said lens barrel unit and support unit, and a relative angular rate of said lens barrel unit and support unit are respectively within predetermined ranges.

10. The camera apparatus defined in claim 8, in which said terminated panning detection means detects the angular rate of said lens barrel unit viewed from the inertia coordinate by receiving a signal from said angular rate detection means and also detects a relative angle between said lens barrel unit and support unit by receiving a signal from said position-detection means.

11. The camera apparatus defined in claim 1, in which said synthesizer-operation changing means causes said synthesizer means to either increase or decrease the amount of gain ranging from a relative angle between said lens barrel unit and support unit to a torque generated by said actuator means.

12. The camera apparatus defined in claim 11, in which said synthesizer-operation changing means substantially contains gain-setting means that provides a specific value corresponding to a relative angle or a relative angular rate between said lens barrel unit and support unit at a moment when an activated panning operation is detected by said panning-operation detection means so that said value makes up a gain from said relative angle between said lens barrel unit and support unit to a torque generated by said actuator means.

13. The camera apparatus defined in claim 1, in which said synthesizer-operation changing means substantially contains gain-correction means that causes said synthesizing means to vary a relative ratio of a gain from a relative angle between said lens barrel unit and support unit to a torque generated by said actuator means, to a gain from the angular rate of said lens barrel unit to the torque generated by said actuator means.

14. The camera apparatus defined in claim 13, in which said gain-correction means causes the relative ratio of the gain to either increase or decrease itself by applying a specific ratio in accordance with an actual relative angular rate between said lens barrel unit and support unit.

15. The camera apparatus defined in claim 13, in which said gain-correction means causes the relative ratio of the gain to either increase or decrease itself by applying a specific value in accordance with an actual relative angular rate between said lens barrel unit and support unit.

16. The camera apparatus defined in claim 13, in which said synthesizer-operation varying means substantially contains gain-setting means that provides a specific value corresponding to the relative angle or the relative angular rate between said lens barrel unit and support unit at a moment when said panning-operation detection means detects an activated panning operation so that said value can be set as an initial relative ratio of the gain.

17. The camera apparatus defined in claim 1, in which said synthesizer-operation varying means causes the signal from synthesizer means to remain irresponsive to a signal from said angular rate detection means except for a signal denoting a relative angle between said lens barrel unit and support unit so that the signal from said synthesizer means can be varied as required, while said synthesizer-operation changing means substantially contains gain-correction means that either increases or decreases an amount of a gain from said relative angle to a torque generated by said actuator means.

18. The camera defined in claim 17, in which said gain-correction means causes the gain to either increase or decrease itself by applying a specific ratio in accordance with the actual relative angular rate between said lens barrel unit and support unit.

19. The camera apparatus defined in claim 17, in which said gain-correction means causes the gain to either increase or decrease itself by applying a specific value in accordance with the actual relative angular rate between said lens barrel unit and support unit.

20. The camera apparatus defined in claim 17, in which said synthesizer-operation changing means substantially contains gain-setting means that sets a specific value corresponding to either the relative angle or relative angular rate between said lens barrel unit and support unit at a moment when said panning-operation detection means detect an activation of panning operation so that said value can be entered as an initial gain.

21. The camera apparatus defined in claim 4, in which said panning start-up detection means detects the relative angle between said lens barrel unit and support unit by receiving a signal from said position-detection means.

22. The camera apparatus defined in claim 9, in which said terminated panning detection means detects the angular rate of said lens barrel unit viewed from the inertia coordinate by receiving a signal from said angular rate detection means and also detects a relative angle between said lens barrel unit and support unit by receiving a signal from said position-detection means.

* * * * *